(12) United States Patent
Iwata et al.

(10) Patent No.: US 8,997,354 B2
(45) Date of Patent: Apr. 7, 2015

(54) MANUFACTURING METHOD FOR TOOTHED MEMBER, MANUFACTURING DEVICE FOR TOOTHED MEMBER, AND TOOTHED MEMBER

(75) Inventors: Daisuke Iwata, Nishio (JP); Tomoyuki Hori, Anjo (JP); Naoki Yokoyama, Nishio (JP); Hiroshi Shibata, Takahama (JP); Masayuki Maki, Misshin (JP)

(73) Assignee: Aisin AW Co., Ltd., Anjo (JP)

( * ) Notice: Subject to any disclaimer, the term of this patent is extended or adjusted under 35 U.S.C. 154(b) by 39 days.

(21) Appl. No.: 13/985,404

(22) PCT Filed: Oct. 24, 2011

(86) PCT No.: PCT/JP2011/074449
§ 371 (c)(1),
(2), (4) Date: Aug. 14, 2013

(87) PCT Pub. No.: WO2012/127726
PCT Pub. Date: Sep. 27, 2012

(65) Prior Publication Data
US 2013/0318792 A1 Dec. 5, 2013

(30) Foreign Application Priority Data

Mar. 24, 2011 (JP) .................................. 2011-066337
Mar. 24, 2011 (JP) .................................. 2011-066340

(51) Int. Cl.
*B21D 53/28* (2006.01)
*B23P 15/14* (2006.01)
(Continued)

(52) U.S. Cl.
CPC ................ *B21D 22/02* (2013.01); *B21D 53/28* (2013.01); *B21D 37/10* (2013.01); *F16H 55/17* (2013.01); *B21K 1/30* (2013.01)

(58) Field of Classification Search
CPC ........ B21D 22/10; B21D 22/28; B21D 22/30; B21D 53/28; B21J 13/02; B21K 1/30; B21K 1/32; B23P 15/14
USPC .................. 29/893.3, 893.33–893.36; 72/469
See application file for complete search history.

(56) References Cited

U.S. PATENT DOCUMENTS 4,381,910 A * 5/1983 Matsumoto et al. .......... 425/398
4,876,876 A * 10/1989 Ishida et al. .................... 72/348
(Continued)

FOREIGN PATENT DOCUMENTS

EP 2 666 561 A1 11/2013
JP S-59-042144 A 3/1984
(Continued)

OTHER PUBLICATIONS

International Search Report issued in International Patent Application No. PCT/JP2011/074449 dated Nov. 29, 2011.
(Continued)

Primary Examiner — Alexander P Taousakis
(74) Attorney, Agent, or Firm — Oliff PLC

(57) ABSTRACT

A manufacturing method for a toothed member includes a thickened tooth shaping process in which a toothed shape is formed on a side wall portion while making a thickness of the side wall portion larger than a thickness of a bottom surface portion by relatively moving the compression die with respect to the restraint die and the pressure receiving member in the axial direction from the side of the opening end of the cup-shaped raw material toward the bottom surface portion. The manufacturing method being such that the thickened tooth shaping process includes applying a load against the restraint die such that the restraint die restrains the first surface and the second surface.

18 Claims, 36 Drawing Sheets

(51) Int. Cl.
*B21D 22/02* (2006.01)
*B21D 37/10* (2006.01)
*F16H 55/17* (2006.01)
*B21K 1/30* (2006.01)

(56) References Cited

U.S. PATENT DOCUMENTS

| | | | | |
|---|---|---|---|---|
| 5,237,744 | A * | 8/1993 | Himmeroeder | 29/893.32 |
| 5,310,432 | A * | 5/1994 | Fukui et al. | 148/330 |
| 5,927,121 | A * | 7/1999 | Rolf et al. | 72/68 |
| 6,016,602 | A * | 1/2000 | Kanemitsu et al. | 29/893.32 |
| 6,233,999 | B1 * | 5/2001 | Yabutani et al. | 72/354.8 |
| 6,959,576 | B2 * | 11/2005 | Hastings et al. | 72/91 |
| 7,350,391 | B2 * | 4/2008 | Takagi | 72/356 |
| 2004/0231447 | A1 * | 11/2004 | Kimura | 74/431 |
| 2005/0278952 | A1 * | 12/2005 | Ooka | 29/893 |
| 2006/0016075 | A1 * | 1/2006 | Oki et al. | 29/893.34 |
| 2007/0234570 | A1 * | 10/2007 | Wang | 29/893 |
| 2011/0126654 | A1 * | 6/2011 | Lev et al. | 74/459.5 |
| 2012/0240405 | A1 * | 9/2012 | Iwata et al. | 29/893.34 |
| 2012/0297910 | A1 * | 11/2012 | Iwata et al. | 74/434 |
| 2013/0081439 | A1 * | 4/2013 | Nakashima et al. | 72/347 |
| 2014/0000334 | A1 * | 1/2014 | Iwata et al. | 72/352 |

FOREIGN PATENT DOCUMENTS

| | | |
|---|---|---|
| JP | H-01-317653 A | 12/1989 |
| JP | A-04-009243 | 1/1992 |
| JP | H-04-22520 A | 1/1992 |
| JP | H-04-127921 A | 4/1992 |
| JP | H05 293586 A | 11/1993 |
| JP | H-07-256377 | 9/1995 |
| JP | H-08-276238 A | 10/1996 |
| JP | B2-2885266 | 4/1999 |
| JP | A-2008-212983 | 9/2008 |
| JP | A-2008-264837 | 11/2008 |
| WO | WO 2004/094083 A2 | 11/2004 |

OTHER PUBLICATIONS

International Search Report issued in International Application No. PCT/JP2011/074440 dated Nov. 29, 2011 (with translation).

Jul. 14, 2014 Extended European Search Report issued in Application No. 11 86 1657.2.

Jul. 15, 2014 Extended European Search Report issued in Application No. 11 86 1508.7.

U.S. Appl. No. 14/001,769, filed Aug. 14, 2013 in the name of Iwata et al.

* cited by examiner

F I G . 14
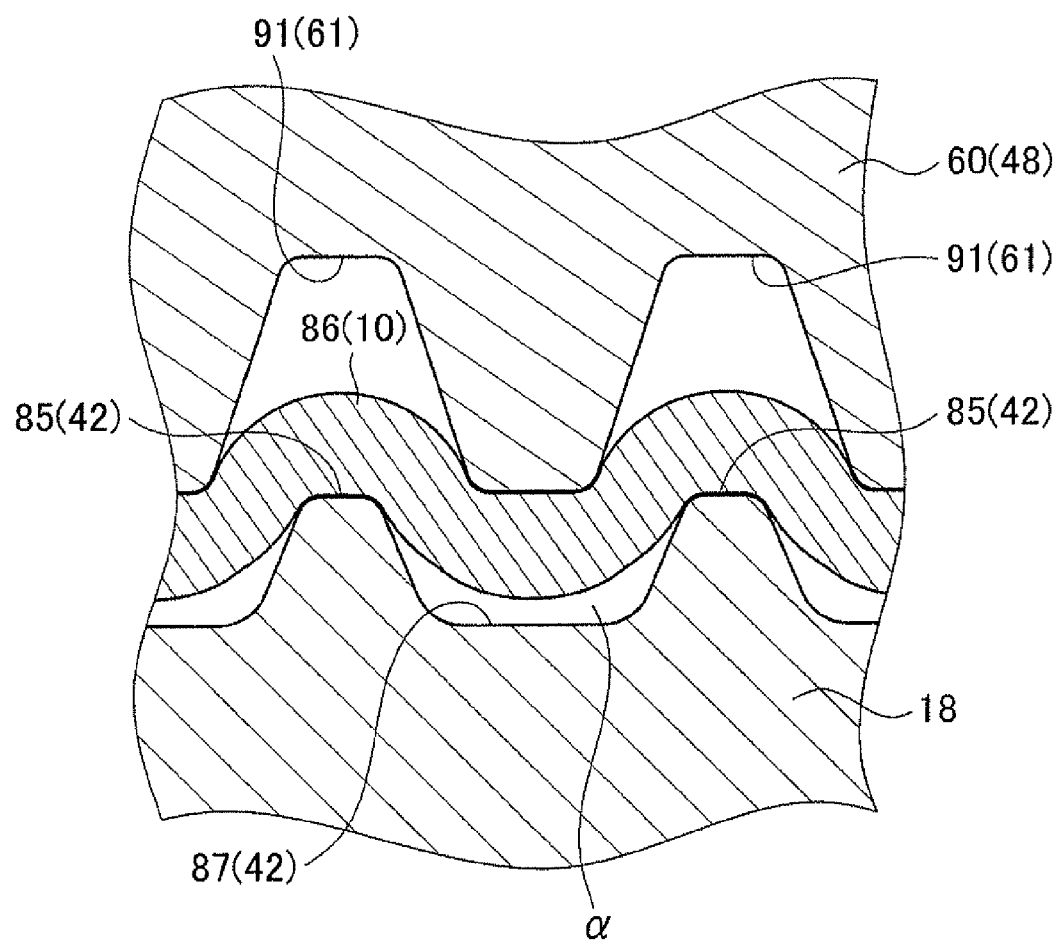

F I G . 32
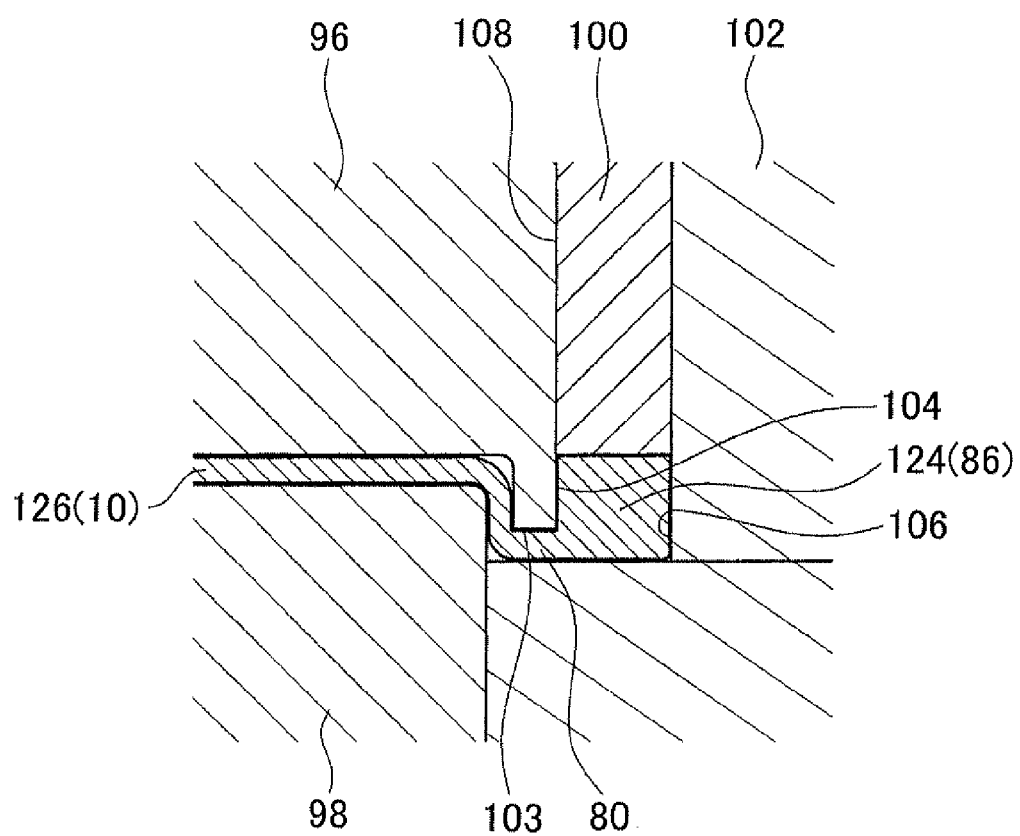

MANUFACTURING METHOD FOR TOOTHED MEMBER, MANUFACTURING DEVICE FOR TOOTHED MEMBER, AND TOOTHED MEMBER

INCORPORATION BY REFERENCE

The disclosure of Japanese Patent Application No. 2011-066337 filed on Mar. 24, 2011 and Japanese Patent Application No. 2011-066340 filed on Mar. 24, 2011 including the specification, drawings and abstract is incorporated herein by reference in its entirety.

BACKGROUND OF THE INVENTION

The present invention relates to a manufacturing method for a toothed member including a bottom surface portion and a side wall portion in a cylindrical shape provided to extend upright in the axial direction from an outer peripheral end portion of the bottom surface portion and formed with teeth, to a manufacturing device for the toothed member, and to the toothed member.

DESCRIPTION OF THE RELATED ART

Japanese Patent No. 2885266 describes a manufacturing method for a toothed member that includes press shaping in which draw shaping is performed on a raw material in a flat plate shape to form a cylindrical side wall portion around the main body of the raw material, and in which thickened tooth shaping is performed to thicken a toothed shape of the side wall portion.

SUMMARY OF THE INVENTION

In pressing a raw material, a transfer press including pressing devices that shape the raw material in a plurality of processes while sequentially transferring the raw material is generally used, and it is considered that such a transfer press is also used in the manufacturing method according to Japanese Patent No. 2885266. In the transfer press, drive means (such as a slide shaft) provided in the pressing devices to drive shaping dies usually has only one axis. Therefore, if the drive means of the pressing devices is used to drive a compression punch that compresses a side wall portion in a process in which the thickened tooth shaping is performed, a restraint punch that restrains the raw material restrains the raw material by applying a load to the raw material using the urging force of a spring or the like, for example.

However, the urging force of a spring is not enough to apply a sufficient load to the restraint punch, and thus the restraint punch may not apply a sufficient load to the raw material. Therefore, as shown in FIG. 36, when a compression punch 200 compresses a side wall portion 204 of a raw material 202, the material of the side wall portion 204 flows toward a bottom surface portion 206 of the raw material 202 to deform the bottom surface portion 206, which raises the restraint punch 208 from the bottom surface portion 206 of the raw material 202. Then, the bottom surface portion 206 of the raw material 202 is no longer restrained by the restraint punch 208. As a result, the material of the side wall portion 204 enters the gap between the restraint punch 208 and the bottom surface portion 206 of the raw material 202 to produce a trapped material 210. The trapped material 210 reduces the strength, and therefore reduces the durability of the toothed member. In particular, in the case where the toothed member is used as a power transfer member, the durability of the toothed member for power transfer is reduced.

The present invention has been made to address the foregoing issues, and therefore has an object to provide a manufacturing method for a toothed member, a manufacturing device for a toothed member, and a toothed member that prevent turning of a material to improve the durability of the toothed member.

In order to address the foregoing issues, an aspect of the present invention provides a manufacturing method for a toothed member that uses a compression die that compresses a side wall portion of a cup-shaped raw material in an axial direction of the cup-shaped raw material, the cup-shaped raw material including a bottom surface portion and the side wall portion which is cylindrical and provided to extend upright from an outer peripheral end portion of the bottom surface portion, a restraint die that restrains a first surface of the bottom surface portion located on a side of an opening end of the cup-shaped raw material, and a pressure receiving member that restrains a second surface of the bottom surface portion located on the opposite side of the bottom surface portion from the first surface, the manufacturing method for a toothed member that includes a thickened tooth shaping process in which a toothed shape is formed on the side wall portion while making a thickness of the side wall portion larger than a thickness of the bottom surface portion by relatively moving the compression die with respect to the restraint die and the pressure receiving member in the axial direction from the side of the opening end of the cup-shaped raw material toward the bottom surface portion, the manufacturing method for a toothed member being characterized in that the thickened tooth shaping process includes applying to the restraint die such a load that allows the restraint die to keep restraining the first surface and the second surface.

According to the aspect, the restraint die is allowed to keep restraining the bottom surface portion of the raw material when the side wall portion of the raw material is compressed, and thus the restraint die is not raised from the bottom surface portion of the raw material. Therefore, the material of the side wall portion is prevented from flowing into the space between the restraint surface of the restraint die and the bottom surface portion of the raw material. This prevents turning of a material, and allows manufacture of a toothed member with improved durability.

In the aspect described above, preferably, the restraint die includes a restraint surface that restrains the first surface and an outer peripheral surface provided to extend upright from an outer peripheral end portion of the restraint surface and having a toothed portion formed on the outer peripheral surface, and the side wall portion is in contact with a tooth tip portion of the toothed portion but not in contact with a tooth root portion of the toothed portion at start of the thickened tooth shaping process.

According to the aspect, a space that allows the side wall portion of the raw material to be expanded when the side wall portion is compressed is provided on the side of the tooth root portion of the toothed portion of the restraint die. Thus, the material of the side wall portion is reliably prevented from flowing into the space between the restraint surface of the restraint die and the bottom surface portion of the raw material. This reliably prevents turning of a material, and allows manufacture of a toothed member with improved durability.

In the aspect described above, preferably, the restraint die includes a restraint surface that restrains the first surface and an outer peripheral surface provided to extend upright from an outer peripheral end portion of the restraint surface, and the side wall portion has been formed with a toothed shape in advance so as to include a small-diameter portion formed on an inner side in a radial direction and a large-diameter portion formed on an outer side in the radial direction with respect to the small-diameter portion, and the large-diameter portion of the side wall portion is spaced from the outer peripheral surface of the restraint die at start of the thickened tooth shaping process.

According to the aspect, the restraint die includes a restraint surface that restrains the first surface of the bottom surface portion of the raw material and an outer peripheral surface provided to extend upright from an outer peripheral end portion of the restraint surface. The side wall portion of the raw material has been formed with a toothed shape in advance so as to include a small-diameter portion formed on the inner side in the radial direction and a large-diameter portion formed on the outer side in the radial direction with respect to the small-diameter portion, and the large-diameter portion of the side wall portion of the raw material is spaced from the outer peripheral surface of the restraint die at the start of the thickened tooth shaping process. In this way, at least a radially inner portion of the large-diameter portion of the side wall portion of the raw material is not restrained at the start of the thickened tooth shaping process. Consequently, as the side wall portion of the raw material is compressed, the material of the side wall portion of the raw material flows at least radially inward. Therefore, the thickness of the side wall portion of the toothed member (a ring gear portion of a drive plate, for example) can be increased. This improves the strength of the toothed member (a drive plate, for example).

In the aspect described above, preferably, the outer peripheral surface of the restraint die is a smooth surface having generally the same diameter over the entire periphery.

According to the aspect, the outer peripheral surface of the restraint die is a smooth surface having generally the same diameter over the entire periphery. Therefore, the strength of the restraint die is improved compared to a case where the restraint die is a punch in which a toothed shape is formed on the outer peripheral surface. This extends the life of the compression die. This also reduces the cost of the compression die.

In the aspect described above, preferably, the compression die is driven by a first slide shaft, and the restraint die is driven by a second slide shaft.

According to the aspect, the restraint die is driven by a slide shaft that is separate from that for the compression die, and thus a sufficient load can be applied to the restraint die. Therefore, it is possible to apply to the restraint die such a load that allows the restraint die to keep restraining the bottom surface portion of the raw material in the thickened tooth shaping process. Thus, the material of the side wall portion is more reliably prevented from flowing into the space between the restraint surface of the restraint die and the bottom surface portion of the raw material. This more reliably prevents turning of a material, and allows manufacture of a toothed member with improved durability.

In the aspect described above, preferably, the thickened tooth shaping process includes compressing the side wall portion which has been formed with a toothed shape in advance.

According to the aspect, the load for compressing the side wall portion of the raw material can be reduced. This reduces a force for raising the restraint die from the bottom surface portion of the raw material when the side wall portion of the raw material is compressed. Thus, the material of the side wall portion is more reliably prevented from flowing into the space between the restraint surface of the restraint die and the bottom surface portion of the raw material. This more reliably prevents turning of a material, and allows manufacture of a toothed member with improved durability. In addition, the side wall portion with a thickened toothed shape can be formed easily by compressing the side wall portion of the raw material.

Preferably, the manufacturing method for a toothed member according to the aspect described above further includes a cup-shaped raw material shaping process in which a disk-shaped raw material is processed while the first surface and the second surface are restrained by the restraint die to form the cup-shaped raw material, and the cup-shaped raw material shaping process and the thickened tooth shaping process are performed in a single-stroke operation in which the restraint die and the pressure receiving member are driven in one direction.

According to the aspect, the area occupied by manufacturing equipment that performs various processes in manufacture of the toothed member can be reduced. In addition, the raw material is processed with the raw material held in a plurality of positioned shaping dies. Thus, a toothed member with high coaxiality can be manufactured.

In order to address the foregoing issues, another aspect of the present invention provides a manufacturing device for a toothed member that forms a toothed shape on a side wall portion of a cup-shaped raw material while making a thickness of the side wall portion larger than a thickness of a bottom surface portion of the cup-shaped raw material by compressing the side wall portion in an axial direction from a side of an opening end of the cup-shaped raw material toward the bottom surface portion, the cup-shaped raw material including the bottom surface portion and the side wall portion which is cylindrical and provided to extend upright from an outer peripheral end portion of the bottom surface portion, the manufacturing device for a toothed member being characterized by including: a restraint die that restrains a first surface of the bottom surface portion located on the side of the opening end of the cup-shaped raw material; a pressure receiving member that restrains a second surface of the bottom surface portion located on the opposite side of the bottom surface portion from the first surface; a compression die that compresses the side surface portion; and a die having a shaping hole into which the restraint die, the pressure receiving member, and the compression die are insertable, in which the side wall portion disposed between the restraint die and the die inside the shaping hole is compressed by relatively moving the compression die with respect to the restraint die and the pressure receiving member while applying to the restraint die such a load that allows the restraint die to keep restraining the first surface and the second surface.

In order to address the foregoing issues, still another aspect of the present invention provides a toothed member formed from a cup-shaped raw material including a bottom surface portion and a side wall portion that is cylindrical and provided to extend upright from an outer peripheral end portion of the bottom surface portion, the toothed member being characterized in that a toothed shape is formed on the side wall portion while making a thickness of the side wall portion larger than a thickness of the bottom surface portion by relatively moving a compression die that compress the side wall portion with respect to a restraint die that restrains a first surface of the bottom surface portion located on a side of an opening end of the cup-shaped raw material and a pressure receiving member that restrains a second surface of the bottom surface portion located on the opposite side of the bottom surface portion from the first surface while applying to the restraint die such a load that allows the restraint die to keep restraining the first surface and the second surface.

According to the manufacturing method for a toothed member, the manufacturing device for a toothed member, and the toothed member of the present invention, it is possible to prevent turning of a material to improve the durability of the toothed member.

BRIEF DESCRIPTION OF THE DRAWINGS

FIG. 14 shows the relationship between the toothed shape of a toothed punch and the workpiece at the start of a thickened tooth shaping process;

FIG. 32 is an enlarged sectional view showing the vicinity of the outer circumferential portion of the workpiece at the time when the thickened tooth shaping process is finished according to the modification of the second embodiment;

DETAILED DESCRIPTION OF THE EMBODIMENTS

Embodiments of the present invention will be described in detail below with reference to the accompanying drawings.

First Embodiment

Configuration of Manufacturing Device

First, the configuration of a manufacturing device 1 for a toothed member according to a first embodiment will be described. The manufacturing device 1 for a toothed member processes a workpiece 10 which is a flat disk-shaped raw material to manufacture a toothed member 12 (see FIG. 22).

Figure 1:
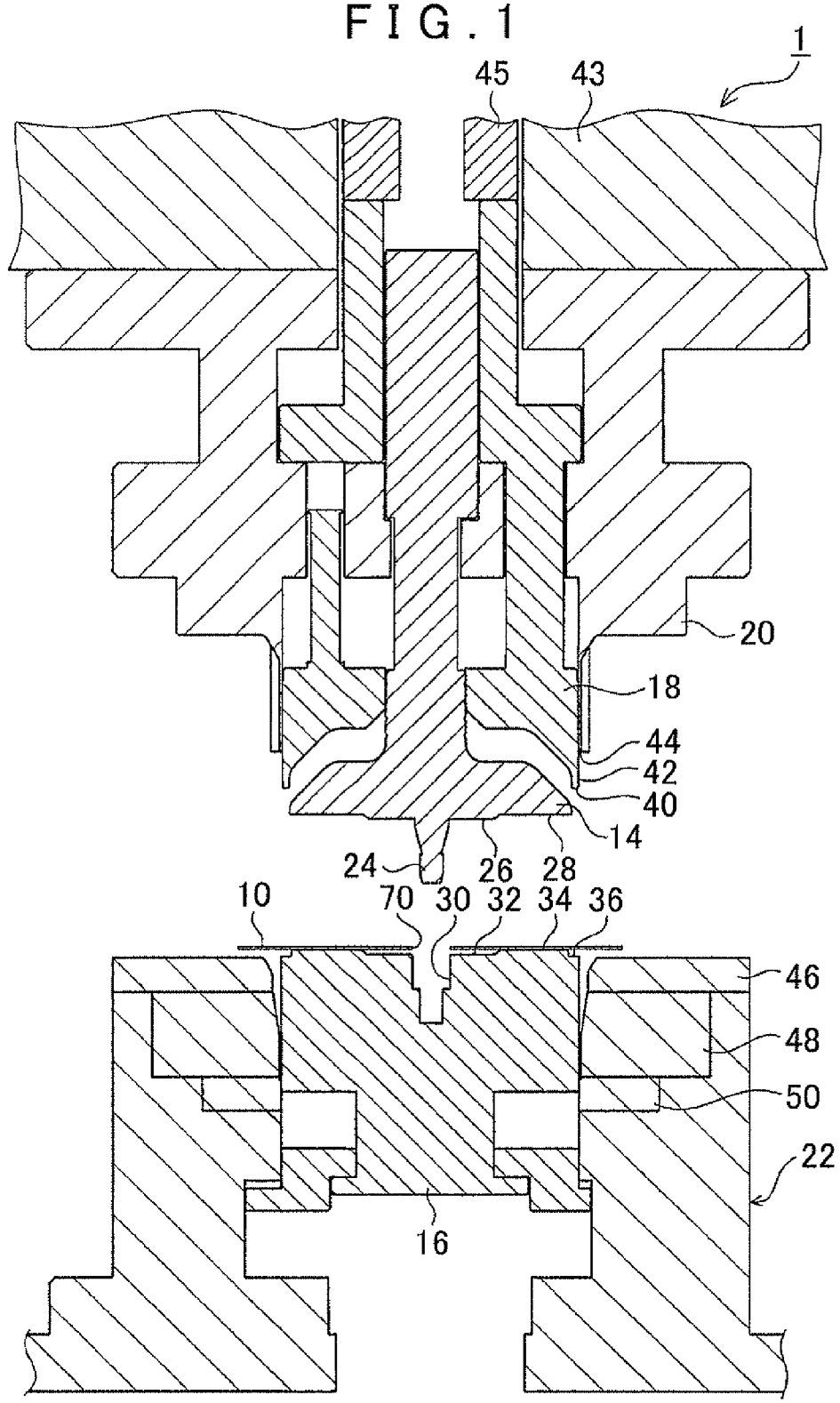
FIG. 1 shows the overall configuration of a manufacturing device for a toothed member according to a first embodiment.

FIG. 1 shows the overall configuration of the manufacturing device 1 for a toothed member according to the first embodiment. FIG. 1 shows a state in a workpiece placement process to be discussed later. As shown in FIG. 1, the manufacturing device 1 for a toothed member includes a first restraint punch 14, a second restraint punch 16, a toothed punch 18, a compression punch 20, and a die portion 22.

The first restraint punch 14 is disposed at a position at which it faces the second restraint punch 16 (at a position in the upper direction of FIG. 1). A surface of the first restraint punch 14 facing the second restraint punch 16 is formed to have a circular outer shape. The surface of the first restraint punch 14 includes a projecting portion 24, a first distal-end surface 26, a second distal-end surface 28, and so forth. The first restraint punch 14 is an example of a member that forms the "restraint die" according to the present invention.

The projecting portion 24 is provided at the center portion of the surface of the first restraint punch 14 facing the second restraint punch 16, and shaped to project on the side of the second restraint punch 16 (on the lower side of FIG. 1) with respect to the first distal-end surface 26 and the second distal-end surface 28. The first distal-end surface 26 is provided on the outer peripheral side of the first restraint punch 14 (on the left-right side of FIG. 1) with respect to the projecting portion 24. The second distal-end surface 28 is provided on the outer peripheral side of the first restraint punch 14 (on the left-right side of FIG. 1) with respect to the first distal-end surface 26. The first distal-end surface 26 is provided on the side of the second restraint punch 16 (on the lower side of FIG. 1) with respect to the second distal-end surface 28.

The second restraint punch 16 is disposed at a position at which it faces the first restraint punch 14 (at a position in the lower direction of FIG. 1). A surface of the second restraint punch 16 facing the first restraint punch 14 is formed to have a circular outer shape. The surface of the second restraint punch 16 includes a recessed portion 30, a first distal-end surface 32, a second distal-end surface 34, an outer periphery facing surface 36, and so forth. The second restraint punch 16 is an example of the "pressure receiving member" according to the present invention.

The recessed portion 30 is provided at the center portion of the surface of the second restraint punch 16 facing the first restraint punch 14, and shaped to be recessed on the side opposite the side of the first restraint punch 14 (on the lower side of FIG. 1) with respect to the first distal-end surface 32 and the second distal-end surface 34. The first distal-end surface 32 is provided on the outer peripheral side of the second restraint punch 16 (on the left-right side of FIG. 1) with respect to the recessed portion 30. The second distal-end surface 34 is provided on the outer peripheral side of the second restraint punch 16 with respect to the first distal-end surface 32. The outer periphery facing surface 36 is provided on the outer peripheral side of the second restraint punch 16 with respect to the second distal-end surface 34. The second distal-end surface 34 is provided on the direction of the first restraint punch 14 (on the upper side of FIG. 1) with respect to the first distal-end surface 32 and the outer periphery facing surface 36.

The toothed punch 18 is disposed outward of the first restraint punch 14. The toothed punch 18 is provided with a distal-end surface 40 facing the second restraint punch 16. The distal-end surface 40 is provided along the shape of the outer periphery of the toothed punch 18, and provided at a position at which it faces the outer periphery facing surface 36 of the second restraint punch 16. An outer peripheral surface 42 provided to extend upright from an outer peripheral end portion of the distal-end surface 40 of the toothed punch 18 is formed in a toothed shape in order to form teeth in a reduced-diameter side wall portion 86 (see FIG. 13) together with a reduced-diameter tooth shaping die 48 to be discussed later. The toothed punch 18 is an example of a member that forms the "restraint die" according to the present invention.

The compression punch 20 is disposed outward of the toothed punch 18. The compression punch 20 is provided with a distal-end surface 44 facing the second restraint punch 16. The distal-end surface 44 is formed in a toothed shape, and provided at a position at which it faces the second restraint punch 16 as described above, and at a position at which it faces a chamfer shaping portion 68 (see FIG. 2) of a backing plate 50 of the die portion 22 to be discussed later. The compression punch 20 is an example of the "compression die" according to the present invention.

In addition, the manufacturing device 1 includes a double-action pressing mechanism including a first slide shaft 43 and a second slide shaft 45. As shown in FIG. 1, the second slide shaft 45 is disposed inside the first slide shaft 43. The compression punch 20 is driven by ascending and descending drive of the first slide shaft 43 to be moved in the up-down direction of FIG. 1. The toothed punch 18 is driven by ascending and descending drive of the second slide shaft 45 to be moved in the up-down direction of FIG. 1. The first slide shaft 43 is driven to be ascended and descended by a first slide shaft drive mechanism (not shown; a mechanism driven by a drive source such as a motor or a hydraulic device). The second slide shaft 45 is driven to be ascended and descended by a second slide shaft drive mechanism (not shown; a mechanism driven by a drive source such as a motor or a hydraulic device).

Figure 2:
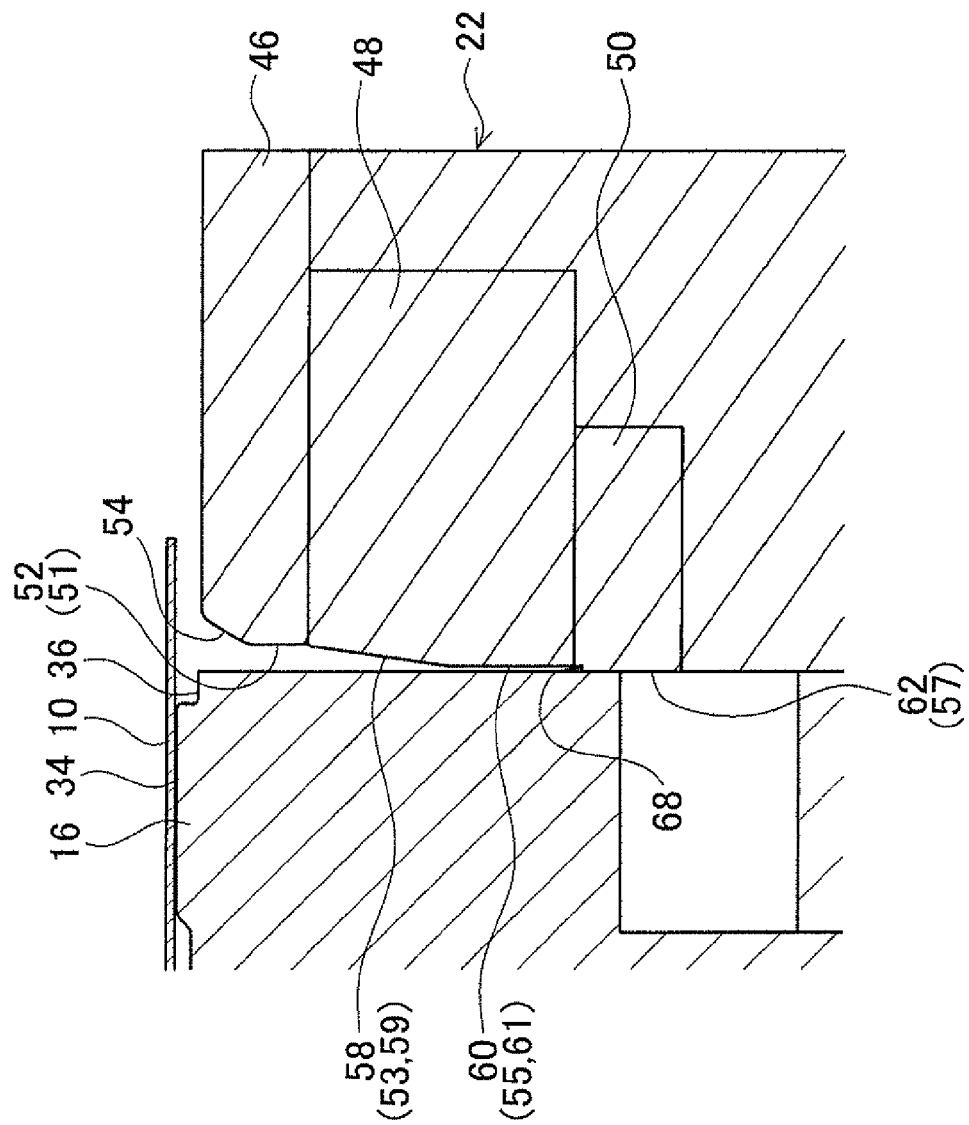
FIG. 2 is an enlarged view showing a main portion around dies.

The die portion 22 is formed by a drawing die 46, the reduced-diameter tooth shaping die 48, the backing plate 50, and so forth. The drawing die 46, the reduced-diameter tooth shaping die 48, and the backing plate 50 are sequentially arranged in this order in the direction in which the toothed punch 18, the first restraint punch 14, and the second restraint punch 16 are sequentially arranged (in the lower direction of FIG. 2). As shown in FIG. 2, the reduced-diameter tooth shaping die 48 includes a diameter reducing die 58 and a tooth shaping die 60, and further plays a role as a thickening die in a thickened tooth shaping process to be discussed later. A draw shaping hole 51 is provided inward of an inner peripheral surface 52 of the drawing die 46. A diameter-reducing shaping hole 53 is provided inward of an inner peripheral surface 59 of the diameter reducing die 58. A tooth shaping hole 55 is provided inward of an inner peripheral surface 61 of the tooth shaping die 60. The first restraint punch 14, the second restraint punch 16, the toothed punch 18, and so forth are inserted into the draw shaping hole 51, the diameter-reducing shaping hole 53, and the tooth shaping hole 55, respectively. FIG. 2 is an enlarged view showing a main portion around the die portion 22.

As shown in FIG. 2, an entrance portion 54 of the inner peripheral surface 52 of the drawing die 46 has a tapered shape with its inside diameter becoming smaller in the direction in which the toothed punch 18 relatively moves with respect to the drawing die 46 (in the lower direction of FIG. 2) in a draw shaping process to be discussed later. The inside diameter of the diameter reducing die 58 is gradually reduced in the direction in which the toothed punch 18, the first restraint punch 14, and the second restraint punch 16 are sequentially arranged (in the lower direction of FIG. 2). The inside diameter of the tooth shaping die 60 is the same as the minimum of the inside diameter of the diameter reducing die 58.

The inner peripheral surface 59 of the diameter reducing die 58 and the inner peripheral surface 61 of the tooth shaping die 60 are formed in a toothed shape in order to form teeth in an inclined side wall portion 82 (see FIG. 9) and the reduced-diameter side wall portion 86 (see FIG. 13) to be discussed later together with the toothed punch 18 described above. The backing plate 50 includes an inner peripheral surface 62 and the chamfer shaping portion 68.

[Manufacturing Method]

Next, a manufacturing method for the toothed member 12 which uses the manufacturing device 1 for a toothed member configured as described above will be described. The manufacturing method for the toothed member 12 according to the embodiment includes the workpiece placement process, a step shaping process, the draw shaping process, a reduced-diameter tooth shaping process, the thickened tooth shaping process, and a releasing process.

<Workpiece Placement Process>

Figure 3:
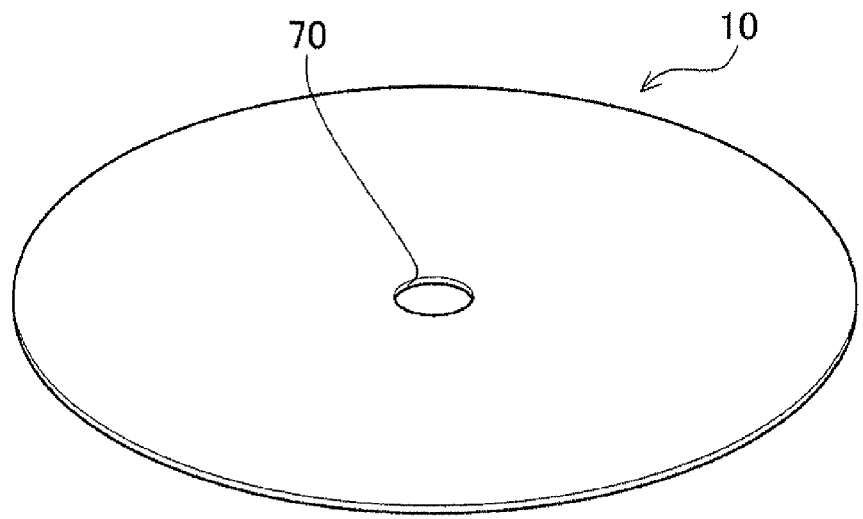
FIG. 3 is a perspective view showing the appearance of a workpiece before being shaped.

First, in the workpiece placement process, as shown in FIG. 1, the workpiece 10 which is a flat disk-shaped raw material made of a metal is placed on the second distal-end surface 34 of the second restraint punch 16. As shown in FIG. 3, a hole portion 70 is formed in advance in the center portion of the workpiece 10 before being shaped.

Figure 4:
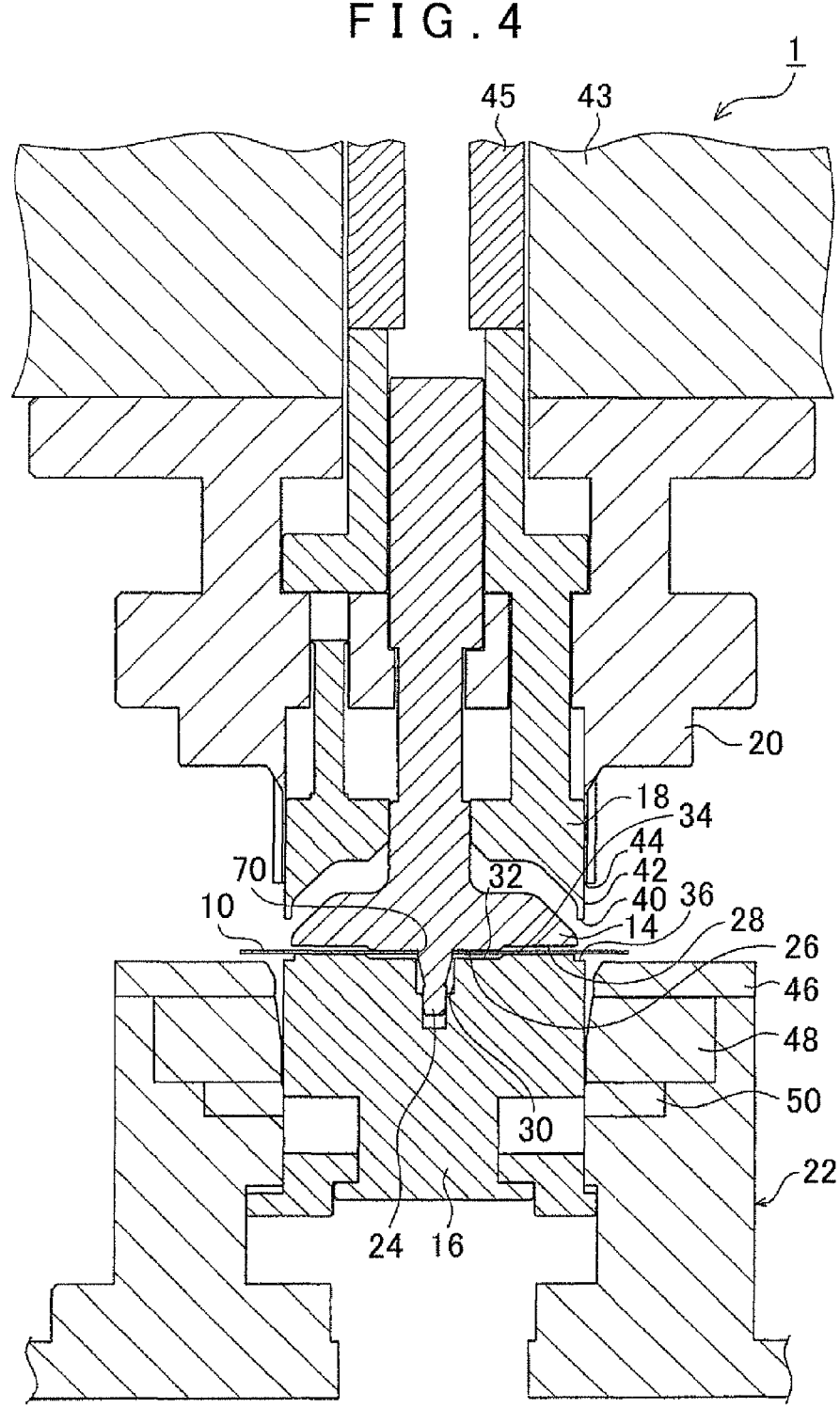
FIG. 4 shows the overall configuration of the manufacturing device for a toothed member in a workpiece placement process.

Then, as shown in FIG. 4, the first restraint punch 14, the toothed punch 18, and the compression punch 20 are relatively advanced with respect to the second restraint punch 16 and the die portion 22 (moved in the lower direction of FIG. 4) with the second restraint punch 16 stationary. Then, the first distal-end surface 26 of the first restraint punch 14 is brought into abutment with the workpiece 10 while inserting the projecting portion 24 of the first restraint punch 14 into the hole portion 70 of the workpiece 10. At this time, the projecting portion 24 of the first restraint punch 14 is inserted into the recessed portion 30 of the second restraint punch 16. Inserting the projecting portion 24 of the first restraint punch 14 into the hole portion 70 of the workpiece 10 in this way can restrict the positional relationship between the workpiece 10 and the first restraint punch 14 in the radial direction of the workpiece 10, which allows positioning between the workpiece 10 and each of the shaping dies.

<Step Shaping Process>

Figure 5:
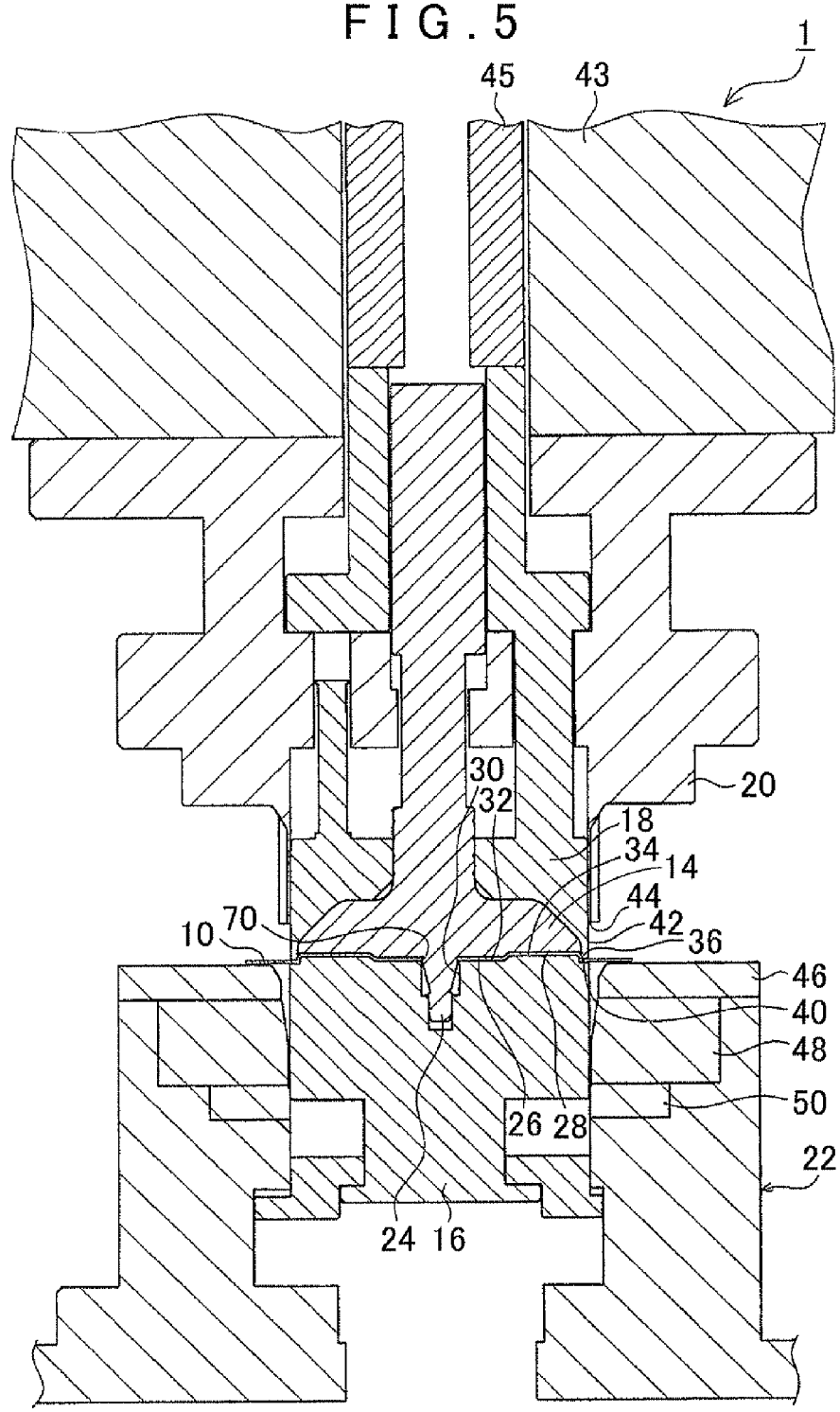
FIG. 5 shows the overall configuration of the manufacturing device for a toothed member in a step shaping process.
Figure 6:
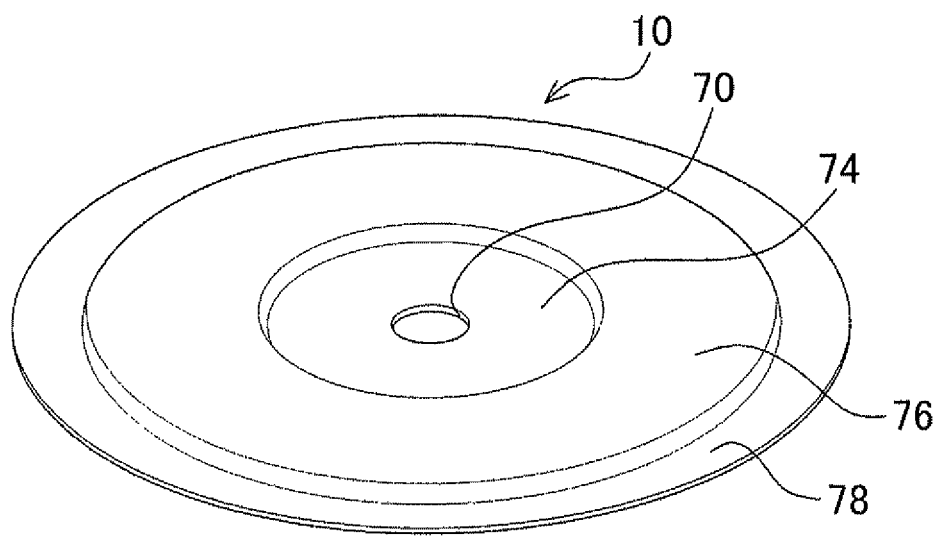
FIG. 6 is a perspective view showing the appearance of the workpiece after the step shaping process is performed.

Next, in the step shaping process, as shown in FIG. 5, the first restraint punch 14, the toothed punch 18, and the compression punch 20 are relatively advanced with respect to the second restraint punch 16 and the die portion 22 (moved in the lower direction of FIG. 5) with the second restraint punch 16 stationary. Then, the first distal-end surface 26 of the first restraint punch 14, the second distal-end surface 28 of the first restraint punch 14, and the distal-end surface 40 of the toothed punch 18 are brought into abutment with the workpiece 10. At this time, the workpiece 10 is pressurized by the first distal-end surface 26 of the first restraint punch 14 and the distal-end surface 40 of the toothed punch 18. Consequently, as shown in FIG. 6, a step is formed between a first portion 74 outward of the hole portion 70 of the workpiece 10 and a second portion 76 outward of the first portion 74. In addition, a step is formed between the second portion 76 of the workpiece 10 and a third portion 78 on the outer side of the second portion 76. In this way, the second portion 76 of the workpiece 10 is projected with respect to the first portion 74 and the third portion 78.

In the toothed member 12 (see FIG. 22) to be discussed later, the first portion 74 of the workpiece 10 corresponds to an inner bottom surface portion 90, and the second portion 76 of the workpiece 10 corresponds to an intermediate bottom surface portion 92. In the toothed member 12 to be discussed later, in addition, a part of the third portion 78 of the workpiece 10 on the inner circumferential side corresponds to an outer bottom surface portion 80.

In this way, the workpiece 10 is restrained by the first restraint punch 14, the second restraint punch 16, and the toothed punch 18 with a step formed between the first portion 74 of the workpiece 10 and the second portion 76 and between the second portion 76 and the third portion 78.

<Draw Shaping Process>

Figure 7:
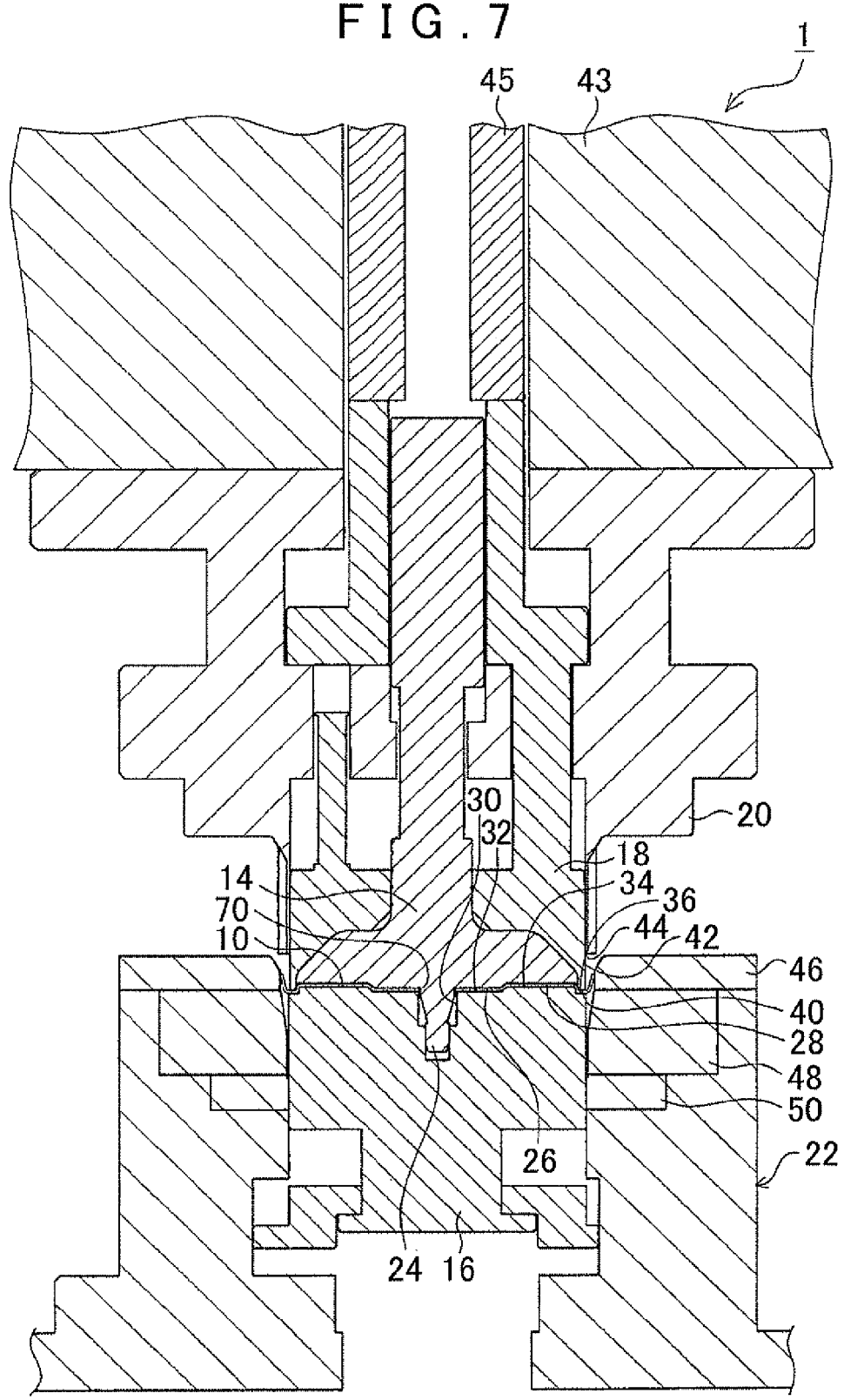
FIG. 7 shows the overall configuration of the manufacturing device for a toothed member in a draw shaping process.

Next, in the draw shaping process, as shown in FIG. 7, the first restraint punch 14, the second restraint punch 16, the toothed punch 18, and the compression punch 20 are relatively advanced with respect to the die portion 22 (moved in the lower direction of FIG. 7) with the workpiece 10 restrained by the first restraint punch 14, the second restraint punch 16, and the toothed punch 18. The draw shaping process is an example of a process that forms the "cup-shaped raw material shaping process" according to the present invention.

Figure 8:
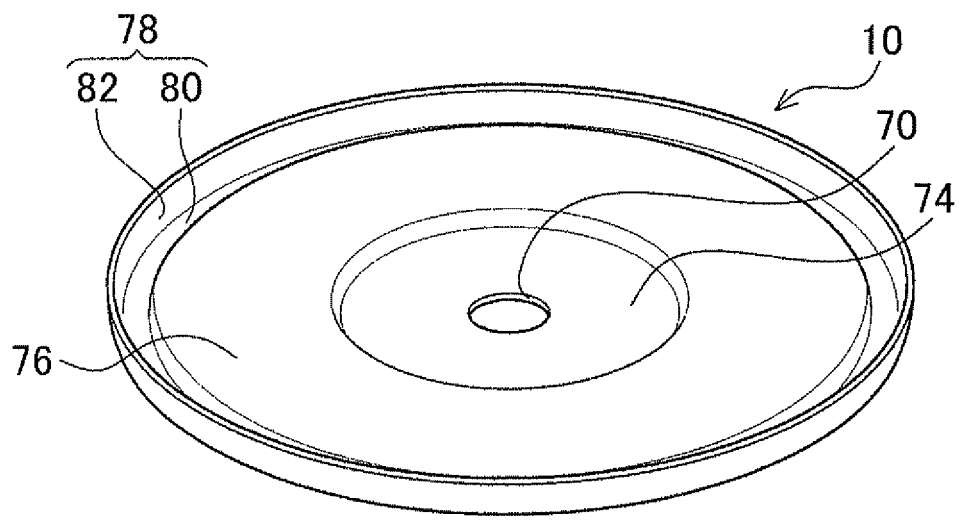
FIG. 8 is a perspective view showing the appearance of the workpiece after the draw shaping process is performed.
Figure 9:
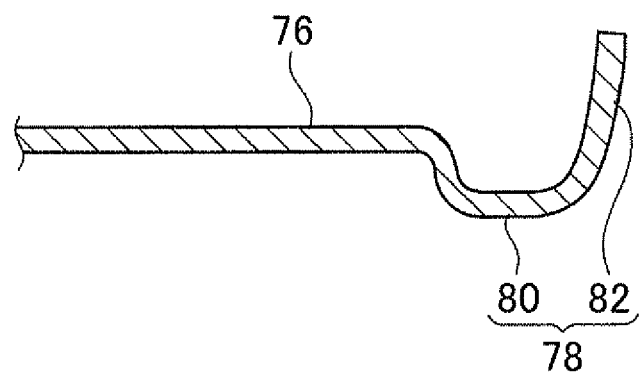
FIG. 9 is an enlarged sectional view showing the outer circumferential portion of the workpiece after the draw shaping process is performed.

Consequently, draw shaping is performed on the workpiece 10 by the toothed punch 18 and the drawing die 46 of the die portion 22. Then, as shown in FIGS. 8 and 9, the third portion 78 of the workpiece 10 is bent to form the outer bottom surface portion 80 and the inclined side wall portion 82 provided to extend upright from an outer peripheral end portion of the outer bottom surface portion 80. Here, the inside diameter of the inclined side wall portion 82 becomes gradually larger in the direction away from the outer bottom surface portion 80 so that the inclined side wall portion 82 is formed in a conical shape.

<Reduced-diameter Tooth Shaping Process>

Figure 10:
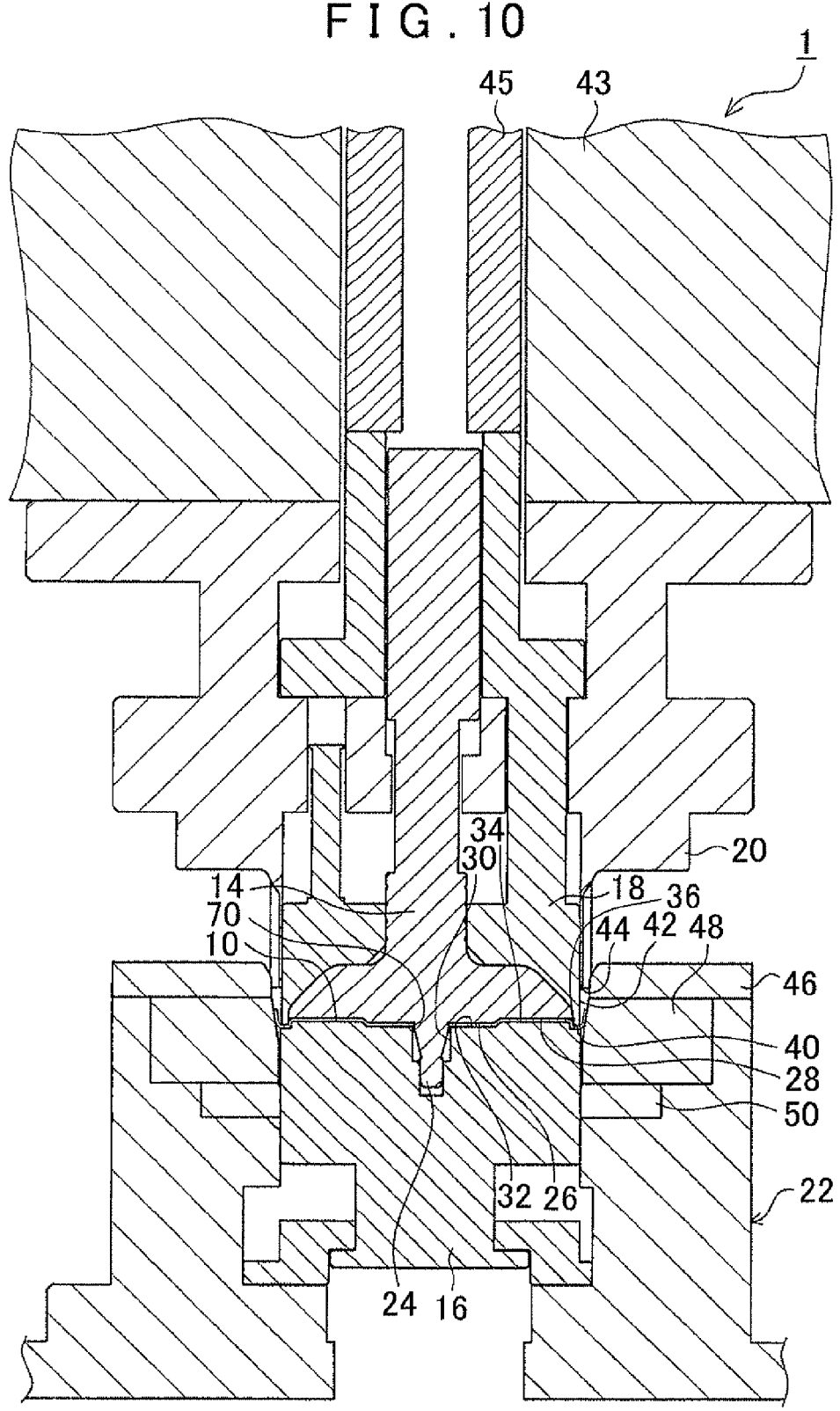
FIG. 10 shows the overall configuration of the manufacturing device for a toothed member in a reduced-diameter tooth shaping process.

Next, in the reduced-diameter tooth shaping process, as shown in FIG. 10, the first restraint punch 14, the second restraint punch 16, the toothed punch 18, and the compression punch 20 are relatively advanced with respect to the die portion 22 (moved in the lower direction of FIG. 10) with the workpiece 10 restrained by the first restraint punch 14, the second restraint punch 16, and the toothed punch 18. Now, diameter-reducing shaping is performed on the workpiece 10 by the toothed punch 18 and the diameter reducing die 58 (see FIG. 2) of the die portion 22. Teeth are formed on the inner peripheral surface 59 (see FIG. 2) of the diameter reducing die 58. Thus, teeth are gradually formed in the inclined side wall portion 82 of the workpiece 10 at the same time in the diameter-reducing shaping.

Figure 11:
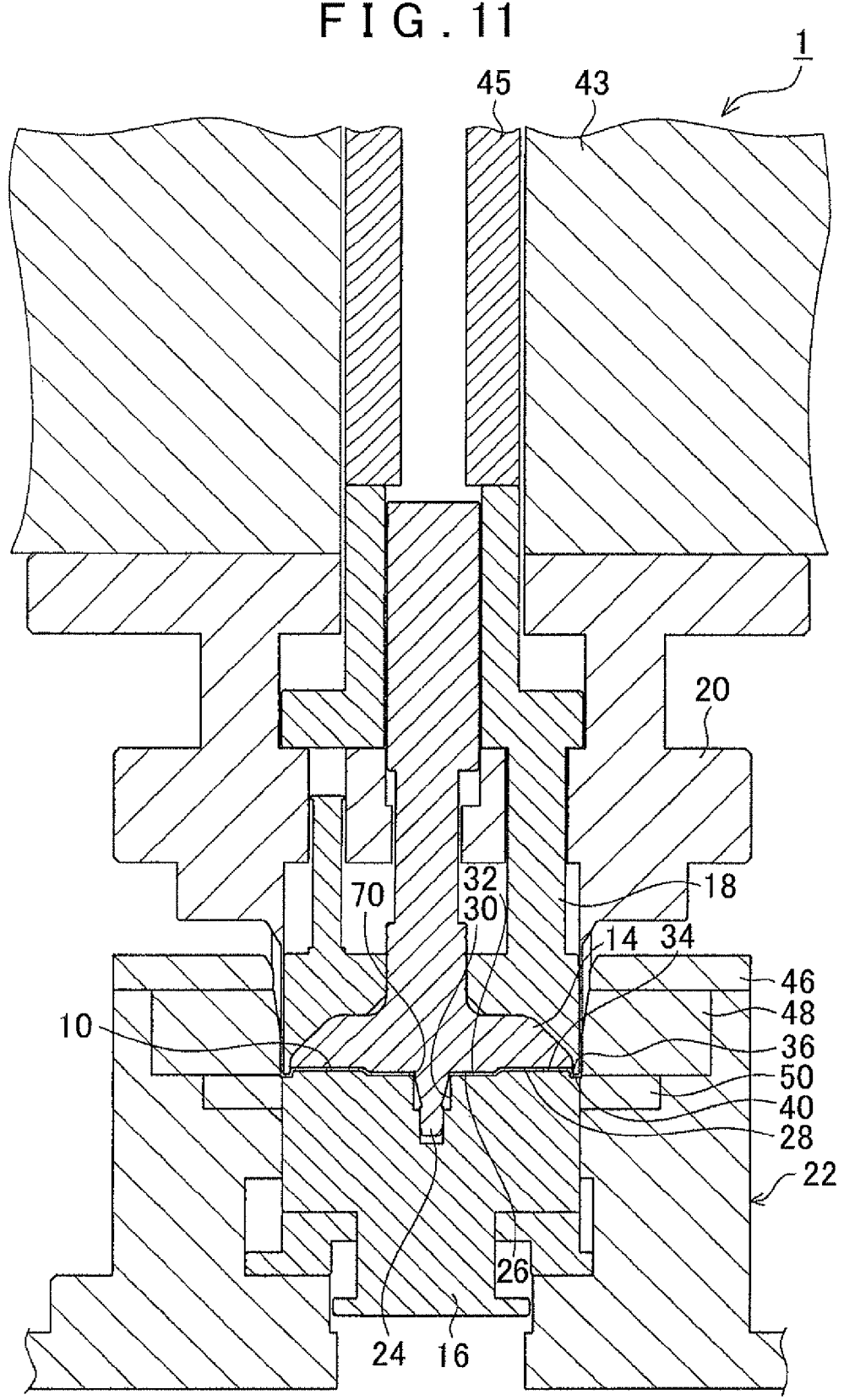
FIG. 11 shows the overall configuration of the manufacturing device for a toothed member after the reduced-diameter tooth shaping process is performed.
Figure 12:
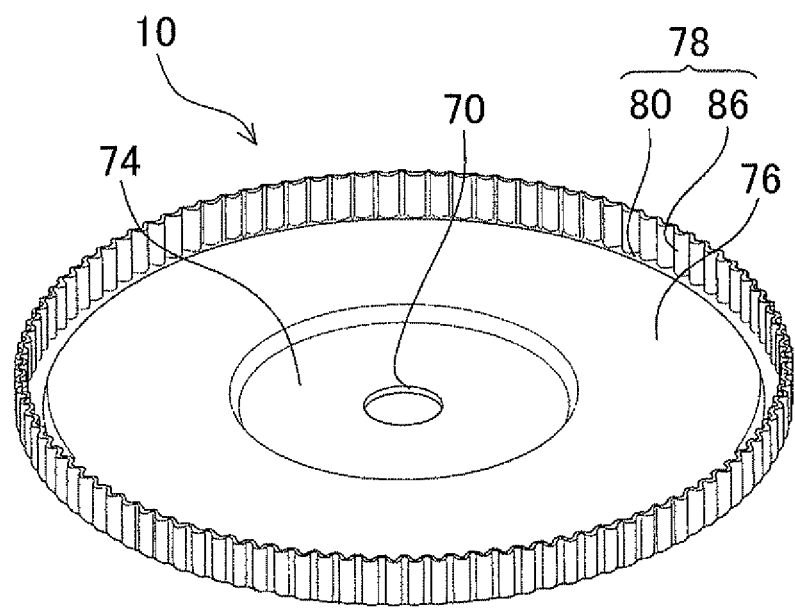
FIG. 12 is a perspective view showing the appearance of the workpiece after the reduced-diameter tooth shaping process is performed.
Figure 13:
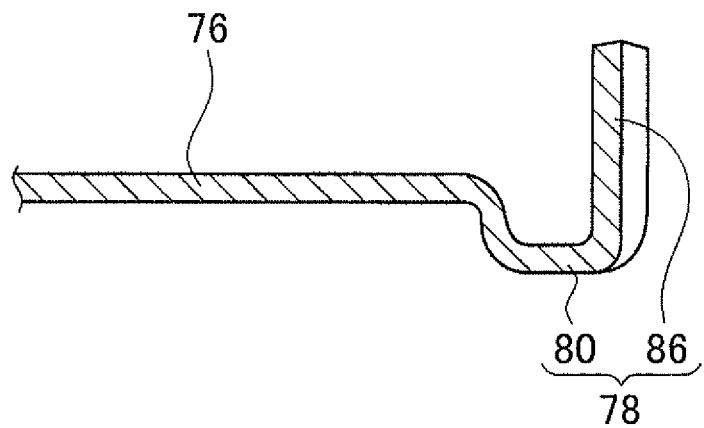
FIG. 13 is an enlarged sectional view showing the outer circumferential portion of the workpiece after the reduced-diameter tooth shaping process is performed.

When the first restraint punch 14, the second restraint punch 16, the toothed punch 18, and the compression punch 20 are further relatively advanced with respect to the die portion 22 (moved in the lower direction of FIG. 10), preliminary tooth shaping is performed on the workpiece 10 by the toothed punch 18 and the tooth shaping die 60 (see FIG. 2) of the die portion 22 as shown in FIG. 11. Consequently, as shown in FIGS. 12 and 13, the reduced-diameter side wall portion 86, which is provided to extend vertically upright from the outer bottom surface portion 80 in the third portion 78 of the workpiece 10 and in which teeth are formed, is formed. That is, the workpiece 10 is formed into a cup shape. The reduced-diameter tooth shaping process is an example of a process that forms the "cup-shaped raw material shaping process" according to the present invention.

<Thickened Tooth Shaping Process>

Next, the thickened tooth shaping process is performed. The dimensions of the toothed shapes of the toothed punch 18 and the tooth shaping die 60 have been set such that a large-diameter portion (tooth-tip portion) 85 on the outer peripheral surface 42 of the toothed punch 18 is in contact with the reduced-diameter side wall portion 86 of the workpiece 10, and a small-diameter portion (tooth-root portion) 87 is not in contact with the reduced-diameter side wall portion 86 of the workpiece 10 at the start of the thickened tooth shaping process as shown in FIG. 14.

Figure 15:
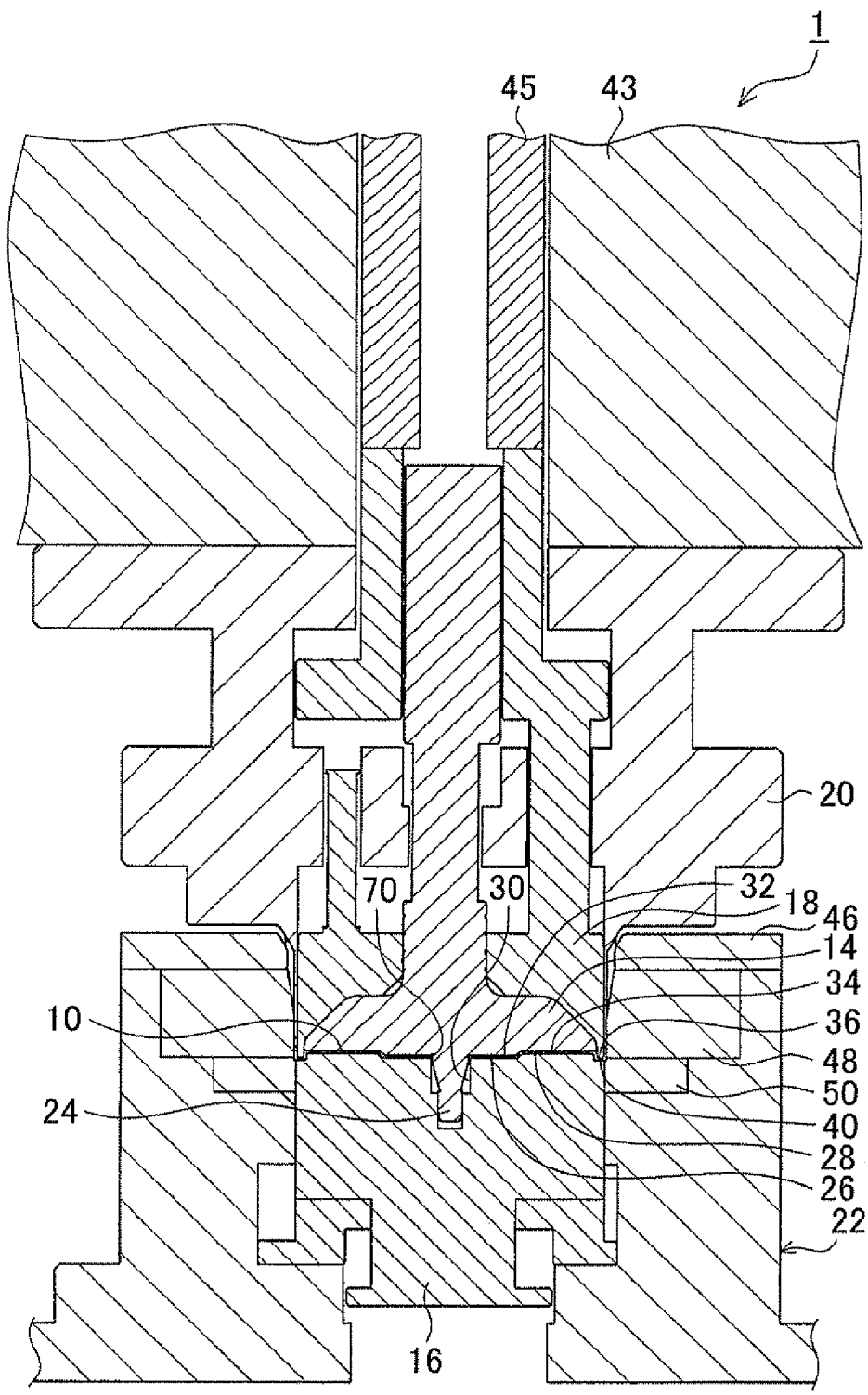
FIG. 15 shows the overall configuration of the manufacturing device for a toothed member in the thickened tooth shaping process.

Then, in the thickened tooth shaping process, as shown in FIG. 15, the compression punch 20 is relatively advanced with respect to the die portion 22 with the cup-shaped workpiece 10 restrained by the first restraint punch 14, the second restraint punch 16, and the toothed punch 18. At this time, the workpiece 10 is restrained by the first restraint punch 14, the second restraint punch 16, and the toothed punch 18 with the second slide shaft 45 applying a predetermined load to the first restraint punch 14 and the toothed punch 18. Then, with the workpiece 10 restrained in this way, the first slide shaft 43 applies a load to the compression punch 20 so that the compression punch 20 compresses the reduced-diameter side wall portion 86 of the workpiece 10 in the axial direction of the workpiece 10 (in the lower direction of FIG. 15).

Figure 16:
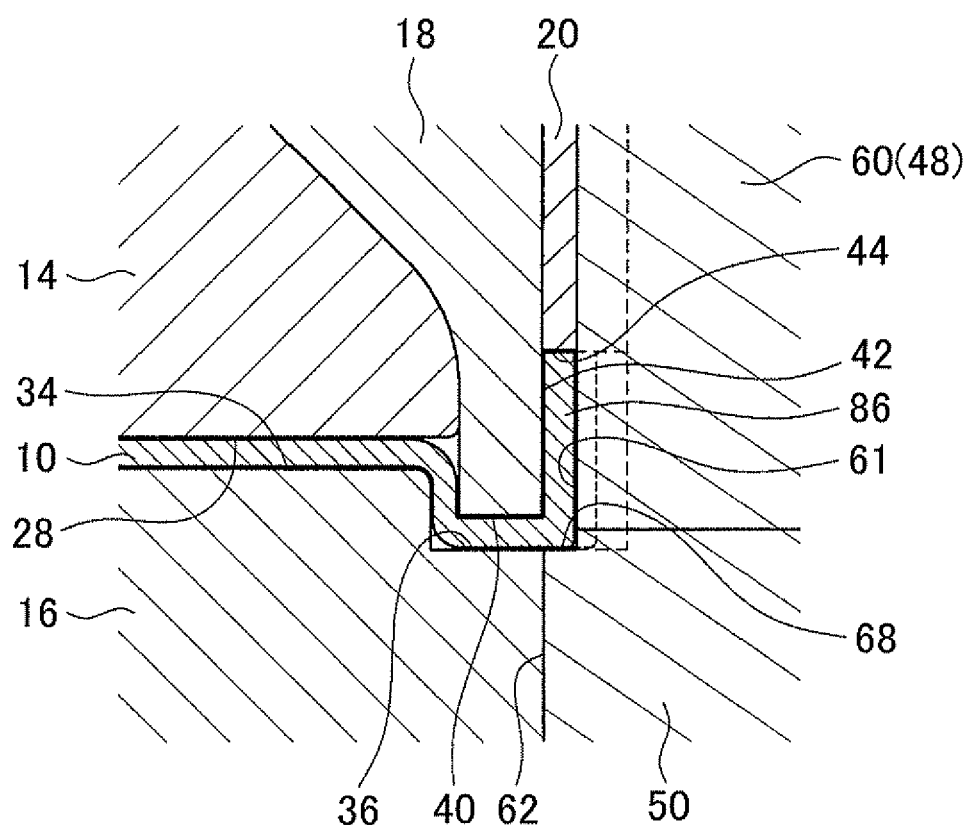
FIG. 16 is an enlarged sectional view showing the vicinity of the outer circumferential portion of the workpiece in the initial stage of the thickened tooth shaping process.
Figure 17:
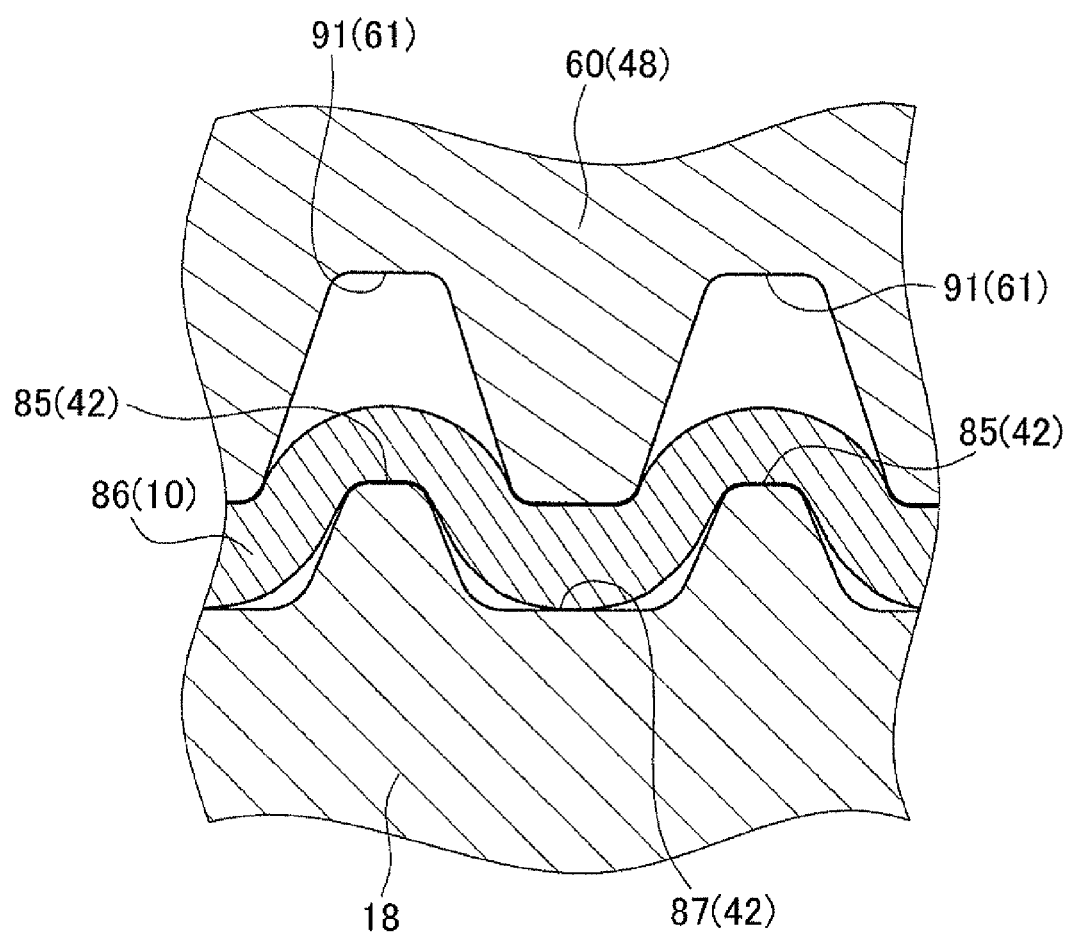
FIG. 17 is a cross-sectional view showing a main portion of the toothed punch, the workpiece, and a tooth shaping die in the initial stage of the thickened tooth shaping process.

Consequently, thickened tooth shaping is performed with the compression punch 20 compressing the reduced-diameter side wall portion 86 (see FIG. 13) of the workpiece 10, which is disposed between the toothed punch 18 and the tooth shaping die 60, in the axial direction of the workpiece 10 (in the lower direction of FIG. 15). In more detail, in the initial stage of the thickened tooth shaping process, the height of the reduced-diameter side wall portion 86 starts reducing as shown in FIG. 16. Then, at the same time, the reduced-diameter side wall portion 86 starts expanding toward the small-diameter portion 87 of the toothed punch 18 and a tooth root portion 91 of the tooth shaping die 60 as shown in FIG. 17, which causes the thickness of the reduced-diameter side wall portion 86 to start increasing.

Figure 18:
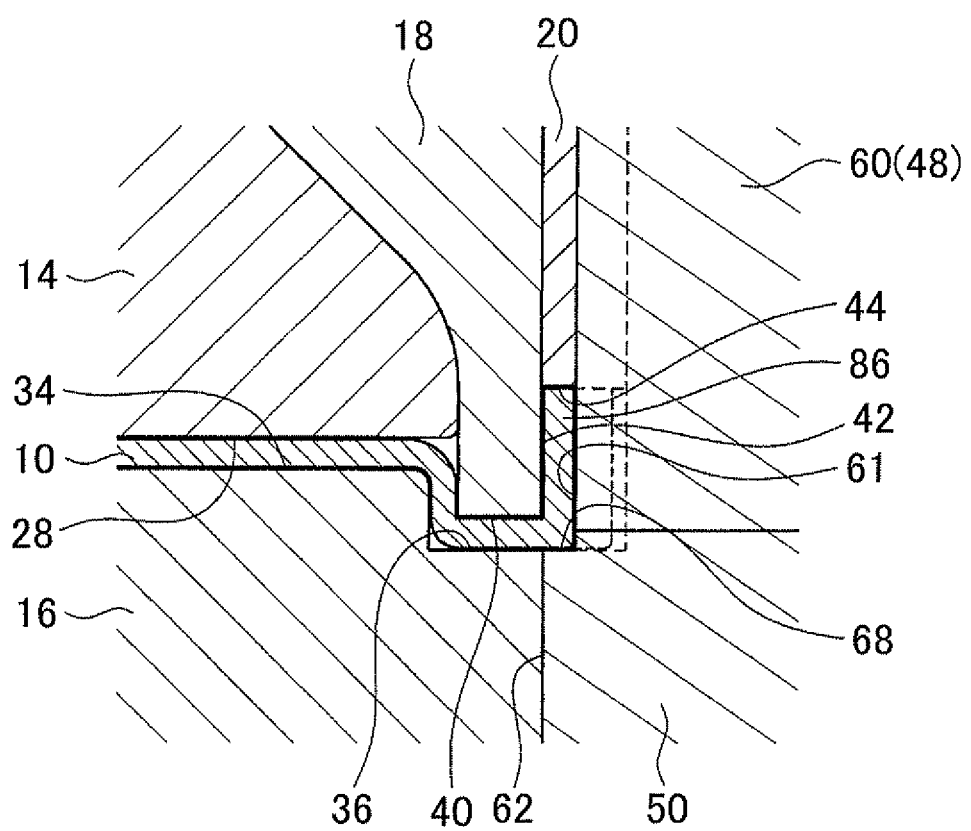
FIG. 18 is an enlarged sectional view showing the vicinity of the outer circumferential portion of the workpiece in the intermediate stage of the thickened tooth shaping process.
Figure 19:
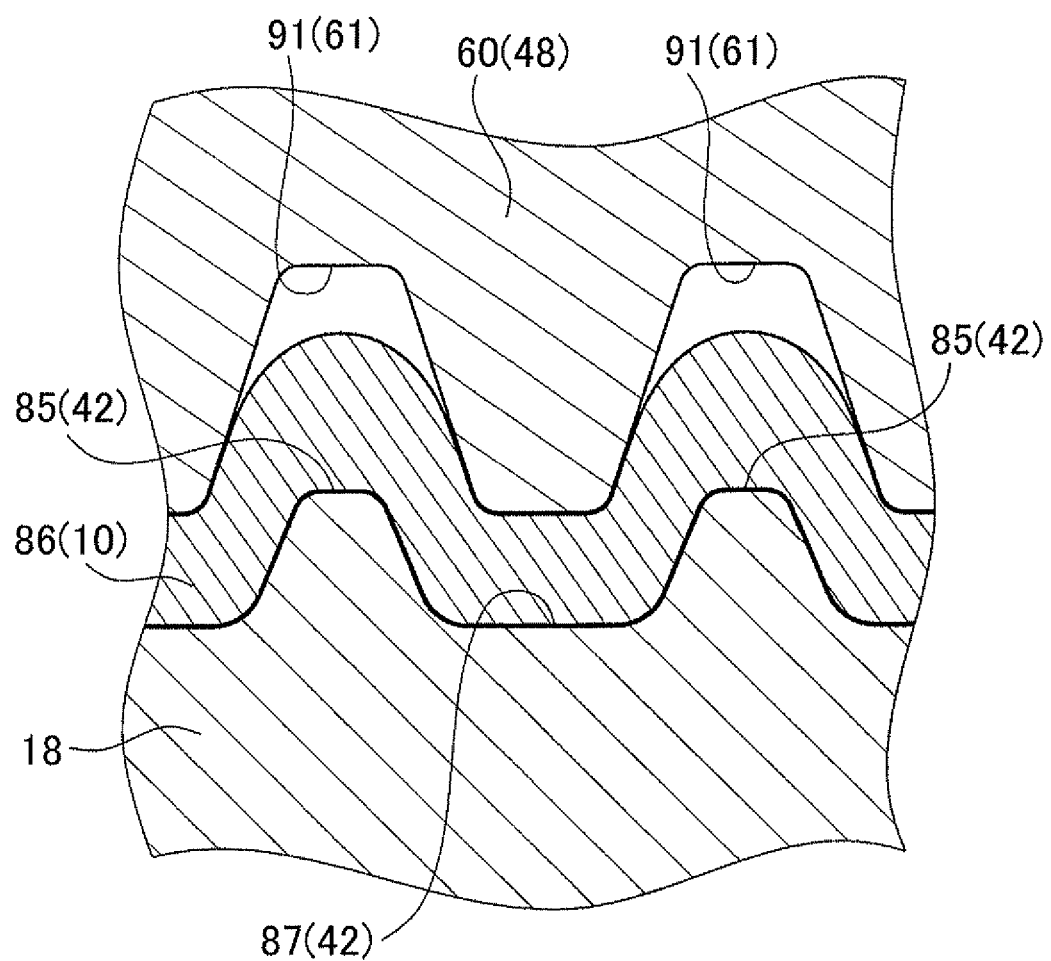
FIG. 19 is a cross-sectional view showing a main portion of the toothed punch, the workpiece, and the tooth shaping die in the intermediate stage of the thickened tooth shaping process.

After that, as the thickened tooth shaping process progresses, the height of the reduced-diameter side wall portion 86 further reduces as shown in FIG. 18. Then, at the same time, the reduced-diameter side wall portion 86 expands toward the small-diameter portion 87 of the toothed punch 18 and the tooth root portion 91 of the tooth shaping die 60 as shown in FIG. 19, which further increases the thickness of the reduced-diameter side wall portion 86.

Figure 20:
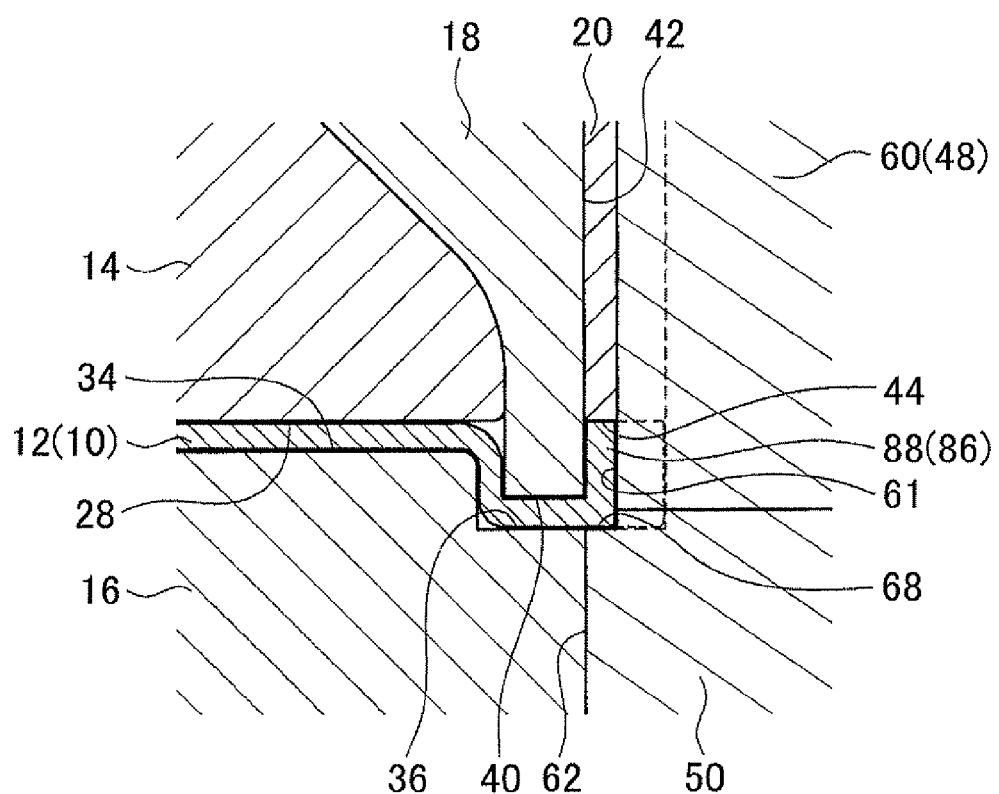
FIG. 20 is an enlarged cross-sectional view showing the vicinity of the outer circumferential portion of the workpiece at the time when the thickened tooth shaping process is finished.
Figure 21:
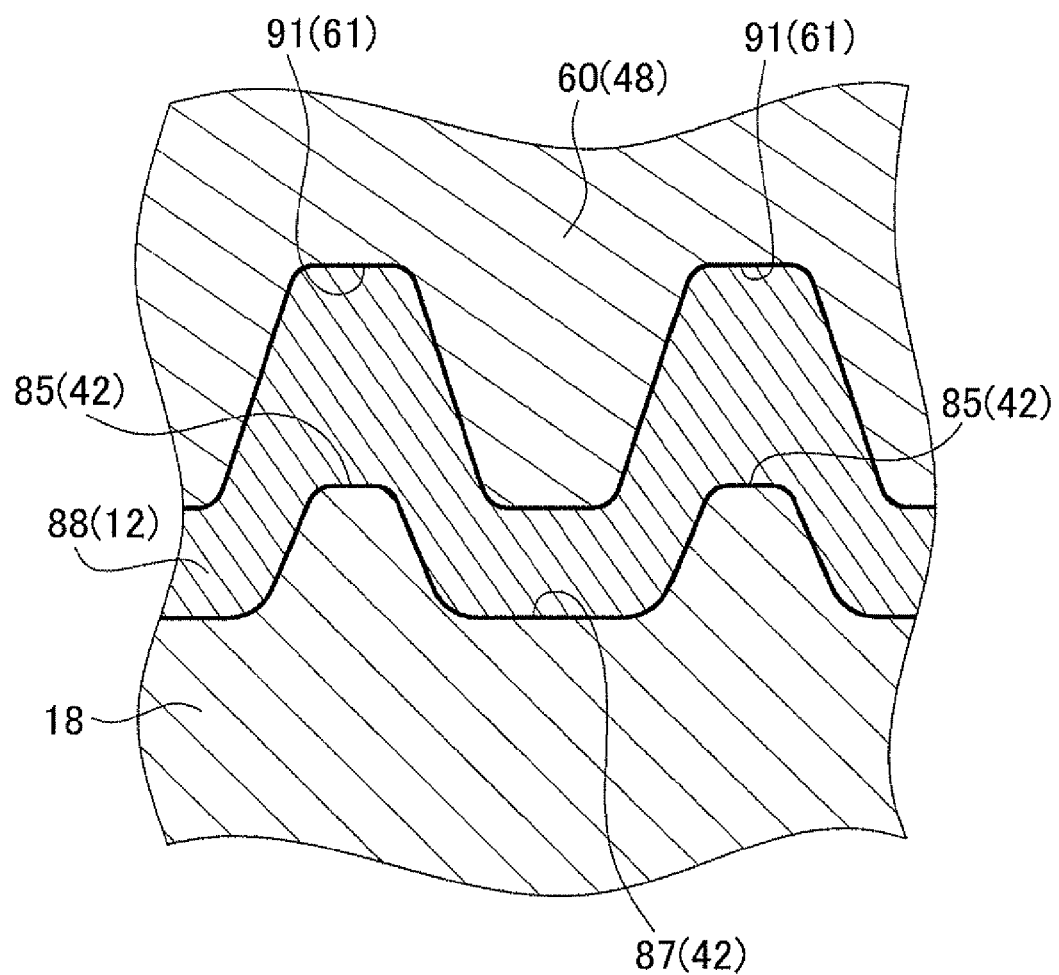
FIG. 21 is a cross-sectional view showing a main portion of the toothed punch, the workpiece, and the tooth shaping die at the time when the thickened tooth shaping process is finished.

Then, when the thickened tooth shaping process is finished, the height of the reduced-diameter side wall portion 86 is further reduced to form a side wall portion 88 as shown in FIG. 20. At this time, the material of the side wall portion 88 fills the space between the small-diameter portion 87 of the toothed punch 18 and the tooth root portion 91 of the tooth shaping die 60 as shown in FIG. 21, thereby forming the side wall portion 88 in a thickened toothed shape.

Figure 22:
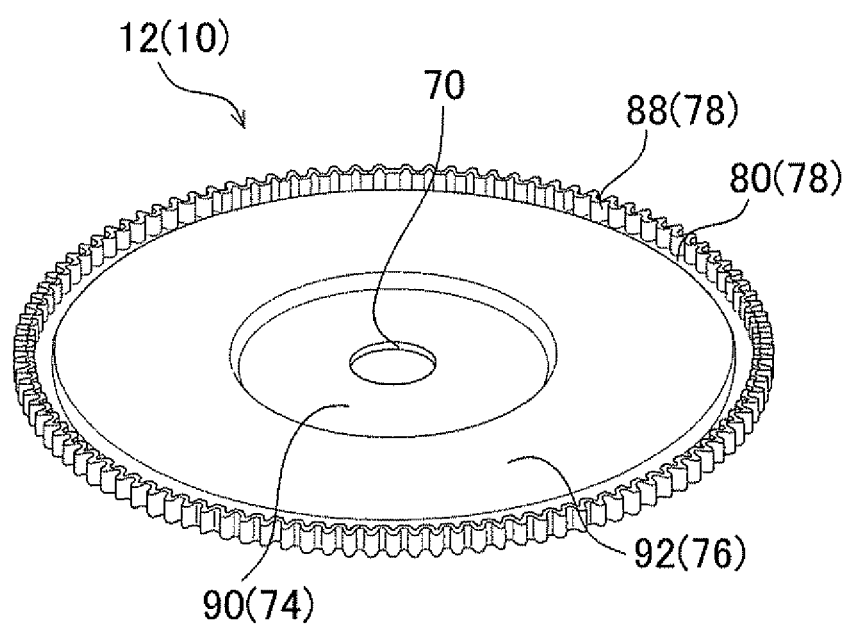
FIG. 22 is a perspective view showing the appearance of the workpiece after the thickened tooth shaping process is performed.
Figure 23:
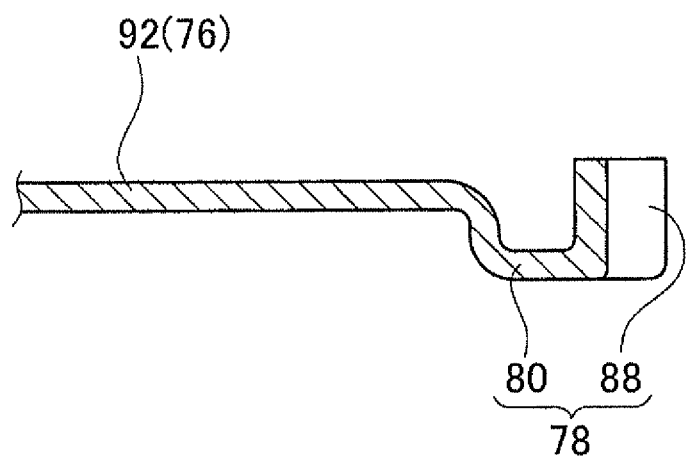
FIG. 23 is an enlarged sectional view showing the outer circumferential portion of the workpiece after the thickened tooth shaping process is performed.

By performing the thickened tooth shaping process as described above, the toothed member 12 having the side wall portion 88 formed with a toothed shape thickened compared to the inner bottom surface portion 90, the intermediate bottom surface portion 92, and the outer bottom surface portion 80 as shown in FIGS. 22 and 23 is formed.

Here, the manufacturing device 1 includes a double-action pressing mechanism including the first slide shaft 43 and the second slide shaft 45, the compression punch 20 is driven by the first slide shaft 43, and the toothed punch 18 is driven by the second slide shaft 45. Then, as described above, when the compression punch 20 compresses the reduced-diameter side wall portion 86, the workpiece 10 is restrained by the first restraint punch 14, the second restraint punch 16, and the toothed punch 18 with the second slide shaft 45 applying a predetermined load to the toothed punch 18. At this time, the predetermined load from the second slide shaft 45 is also applied to the first restraint punch 14 via the toothed punch 18.

At this time, the predetermined load applied from the second slide shaft 45 to the first restraint punch 14 and the toothed punch 18 is set to a load large enough to allow the first restraint punch 14 and the toothed punch 18 to keep restraining the bottom surface portion of the workpiece 10, that is, such a large load that the first restraint punch 14 and the toothed punch 18 tightly contact the bottom surface portion of the workpiece 10 and are not raised from the bottom surface portion of the workpiece 10, in the thickened tooth shaping. In further detail, the second slide shaft 45 applies to the first restraint punch 14 and the toothed punch 18 such a load that the first restraint punch 14 and the toothed punch 18 are not raised from the bottom surface portion of the workpiece 10 even when the load applied to the workpiece 10 by the compression punch 20 pressurized by the first slide shaft 43 becomes maximum. Consequently, as shown in FIGS. 16, 18, and 20, the first restraint punch 14 and the toothed punch 18 are not raised from the bottom surface portion of the workpiece 10 when the thickened tooth shaping is performed. Therefore, the thickened tooth shaping can be performed with the first restraint punch 14 and the toothed punch 18 reliably restraining the bottom surface portion of the workpiece 10. Thus, the material of the reduced-diameter side wall portion 86 is prevented from flowing into the space between the distal-end surface 40 of the toothed punch 18 and the outer bottom surface portion 80 of the workpiece 10. Hence, trapping of the material such as that described in relation to the related art is not caused at the reduced-diameter side wall portion 86 of the workpiece 10 and the side wall portion 88 of the toothed member 12. In addition, the bottom surface portion of the workpiece 10 is restrained with a sufficient load when the thickened tooth shaping is performed, thereby omitting a process of correcting the flatness of the bottom surface portion of the workpiece 10.

As shown in FIG. 14, the dimensions of the toothed shapes of the toothed punch 18 and the tooth shaping die 60 have been set such that the workpiece 10 is restrained by the large-diameter portion 85 on the outer peripheral surface 42 of the toothed punch 18 but not restrained by the small-diameter portion 87 at the start of the thickened tooth shaping process. Consequently, a space a (see FIG. 14) that allows the reduced-diameter side wall portion 86 to be expanded when the reduced-diameter side wall portion 86 is compressed by the compression punch 20 is provided on the side of the small-diameter portion 87 of the toothed punch 18. Therefore, the material of the reduced-diameter side wall portion 86 is prevented from flowing into the space between the distal-end surface 40 of the toothed punch 18 and the outer bottom surface portion 80 of the workpiece 10 at the small-diameter portion 87 of the toothed punch 18, thereby preventing trapping of the material more reliably.

Teeth are formed in the reduced-diameter side wall portion 86 in advance in the reduced-diameter tooth shaping process, and thus the load against compression shaping performed by the compression punch 20 is reduced to reduce the shaping load. This reduces a force for raising the first restraint punch 14 and the toothed punch 18 from the bottom surface portion of the workpiece 10, thereby suppressing occurrence of trapping of the material.

<Releasing Process>

Figure 24:
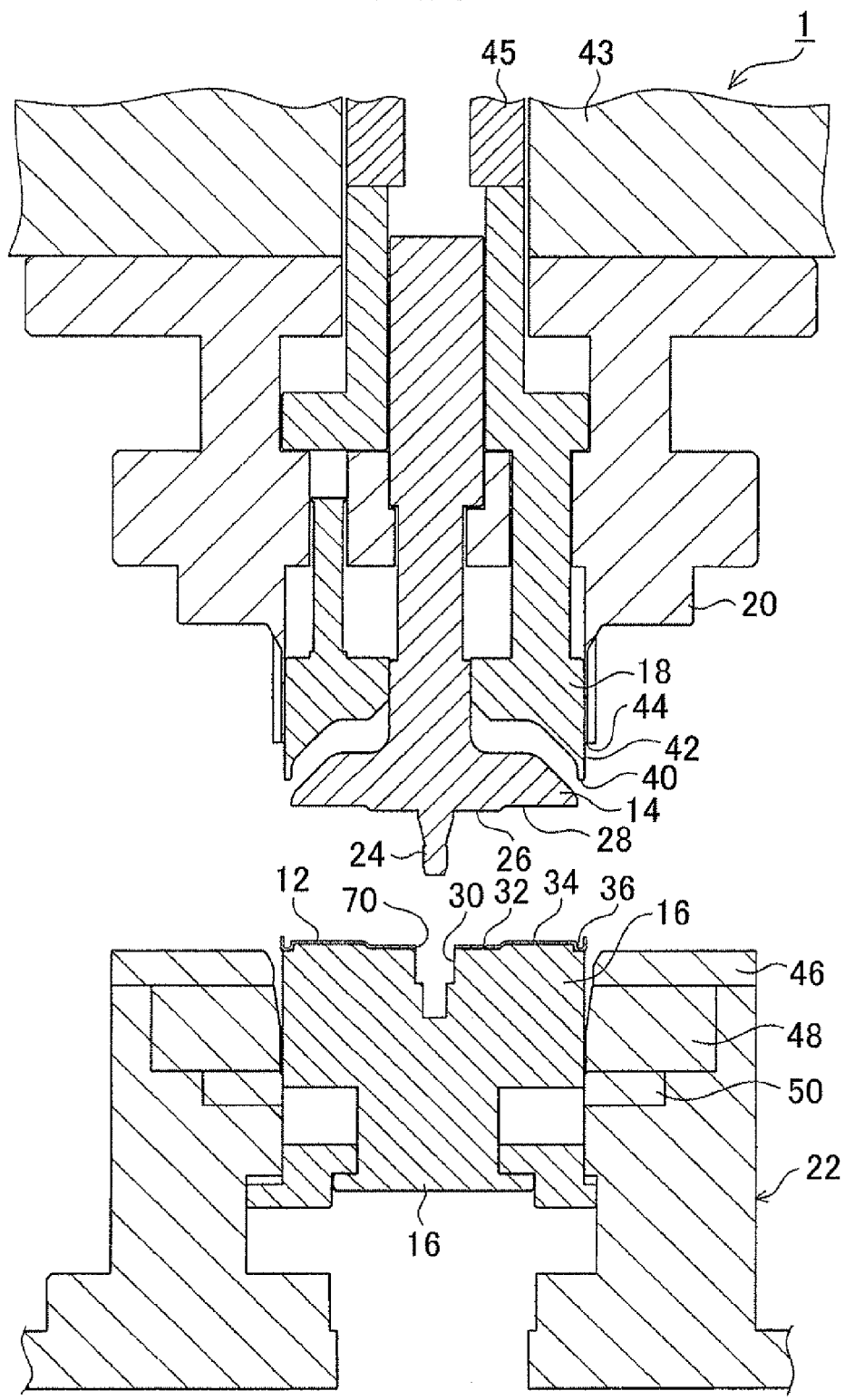
FIG. 24 shows the overall configuration of the manufacturing device for a toothed member in a releasing process.

Next, in the releasing process, as shown in FIG. 24, the first restraint punch 14, the second restraint punch 16, the toothed punch 18, and the compression punch 20 are retracted with respect to the die portion 22, and further the first restraint punch 14, the toothed punch 18, and the compression punch 20 are retracted with respect to the second restraint punch 16. Then, the toothed member 12 is taken out of the manufacturing device 1.

In this way, the toothed member 12 (see FIG. 22) including the bottom surface portion (the inner bottom surface portion 90, the intermediate bottom surface portion 92, and the outer bottom surface portion 80) and the side wall portion 88 provided to extend vertically upright from an outer peripheral end portion of the outer bottom surface portion 80 of the bottom surface portion can be manufactured from the workpiece 10 having a disk shape.

Figure 25:
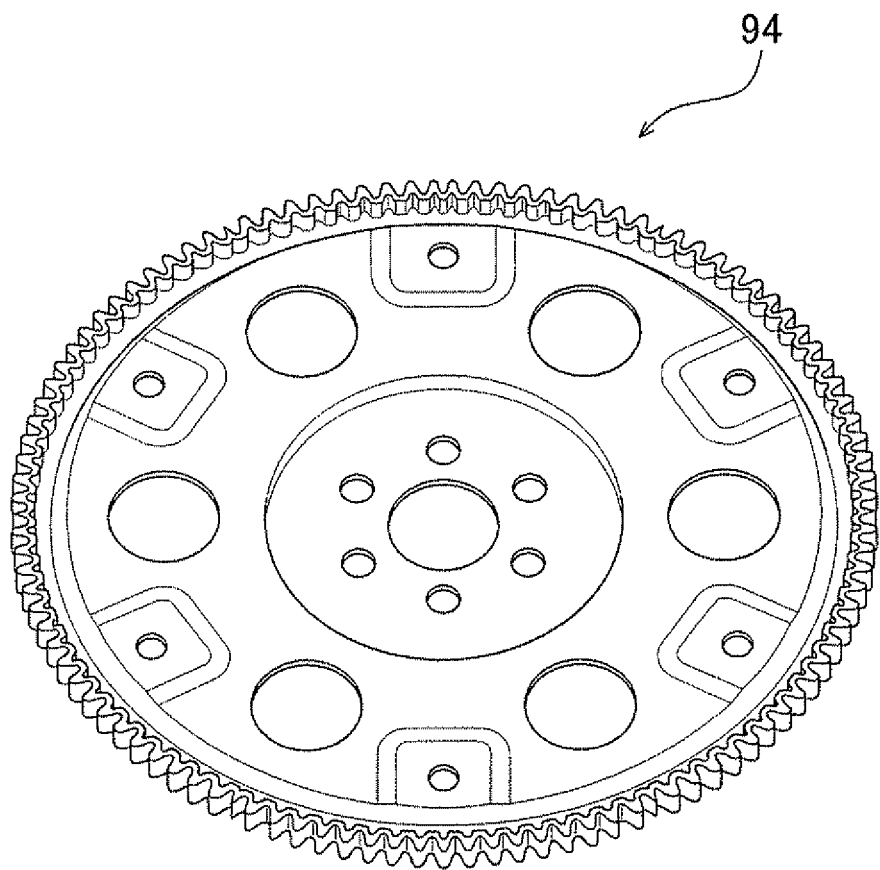
FIG. 25 is a perspective view showing the appearance of a drive plate formed integrally with a ring gear.

The toothed member 12 formed as described above can thereafter be subjected to a heat treatment or a hole forming process to form a drive plate 94 formed integrally with a ring gear as shown in FIG. 25, for example. The drive plate 94 formed integrally with a ring gear may serve as a power transfer member that links an engine of a vehicle and a torque converter of a transmission to each other. In the related art, two components, namely a drive plate and a ring gear, are welded to each other to be manufactured. According to the embodiment, however, the drive plate 94 shaped integrally with a ring gear can be manufactured by pressing from the single workpiece 10 in a flat plate shape. According to the embodiment, in addition, trapping of the material such as that described above can be prevented, thereby improving the durability for power transfer of the drive plate 94 formed from the toothed member 12 formed in accordance with the embodiment.

Effects of the Embodiment

In the embodiment, in the thickened tooth shaping process, such a load that allows maintaining a state in which the bottom surface portion (the first portion 74, the second portion 76, and the outer bottom surface portion 80 of the third portion 78) of the workpiece 10 is restrained is applied to the first restraint punch 14 and the toothed punch 18. Therefore, it is possible to allow the first restraint punch 14 and the toothed punch 18 to keep restraining the bottom surface portion of the workpiece 10 when the reduced-diameter side wall portion 86 is compressed in the axial direction of the workpiece 10, which does not raise the first restraint punch 14 and the toothed punch 18 from the bottom surface portion of the workpiece 10. Thus, the material of the reduced-diameter side wall portion 86 is prevented from flowing into the space between the distal-end surface 40 of the toothed punch 18 and the outer bottom surface portion 80 of the workpiece 10. This prevents trapping of the material, and allows manufacture of the toothed member 12 with improved durability.

At the start of the thickened tooth shaping process, the reduced-diameter side wall portion 86 is not in contact with the small-diameter portion 87 of the toothed portion of the toothed punch 18. Consequently, the space a which allows the reduced-diameter side wall portion 86 to be expanded when the reduced-diameter side wall portion 86 is compressed in the axial direction of the workpiece 10 is provided on the side of the small-diameter portion 87 of the toothed portion of the toothed punch 18. Thus, the material of the reduced-diameter side wall portion 86 is reliably prevented from flowing into the space between the distal-end surface 40 of the toothed punch 18 and the outer bottom surface portion 80 of the workpiece 10. This reliably prevents trapping of the material, and allows manufacture of the toothed member 12 with improved durability.

The toothed punch 18 and the compression punch 20 are driven by separate slide shafts, and thus a sufficient load can be applied to the first restraint punch 14 and the toothed punch 18 rather than a weak load applied by a spring or the like as in the related art. Thus, the material of the reduced-diameter side wall portion 86 is more reliably prevented from flowing into the space between the distal-end surface 40 of the toothed punch 18 and the outer bottom surface portion 80 of the workpiece 10 in the thickened tooth shaping process. This more reliably prevents trapping of the material, and allows manufacture of the toothed member 12 with improved durability.

Because the reduced-diameter tooth shaping process is performed, the reduced-diameter side wall portion 86 in which teeth have been formed in advance is processed in the thickened tooth shaping process, and thus the load for compressing the reduced-diameter side wall portion 86 can be reduced. This reduces a force for raising the first restraint punch 14 and the toothed punch 18 from the bottom surface portion of the workpiece 10 when the reduced-diameter side wall portion 86 is compressed. Thus, the material of the reduced-diameter side wall portion 86 is more reliably prevented from flowing into the space between the distal-end surface 40 of the toothed punch 18 and the outer bottom surface portion 80 of the workpiece 10. This more reliably prevents trapping of the material, and allows manufacture of the toothed member 12 with improved durability. In addition, the side wall portion 88 with a thickened toothed shape can be formed easily by compressing the reduced-diameter side wall portion 86.

The workpiece 10 is processed to manufacture the toothed member 12 in a single-stroke operation (one-stroke operation). Thus, various processes can be performed at one location to reduce the area occupied by the manufacturing device 1 and hence the size of the manufacturing device 1. In addition, the workpiece 10 is processed with the workpiece 10 held in a plurality of positioned shaping dies (the first restraint punch 14, the second restraint punch 16, the toothed punch 18, and the compression punch 20). Thus, the toothed member 12 with high coaxiality can be manufactured. Here, the single-stroke operation is an operation in which the shaping dies are moved in one direction.

Second Embodiment

Figure 26:
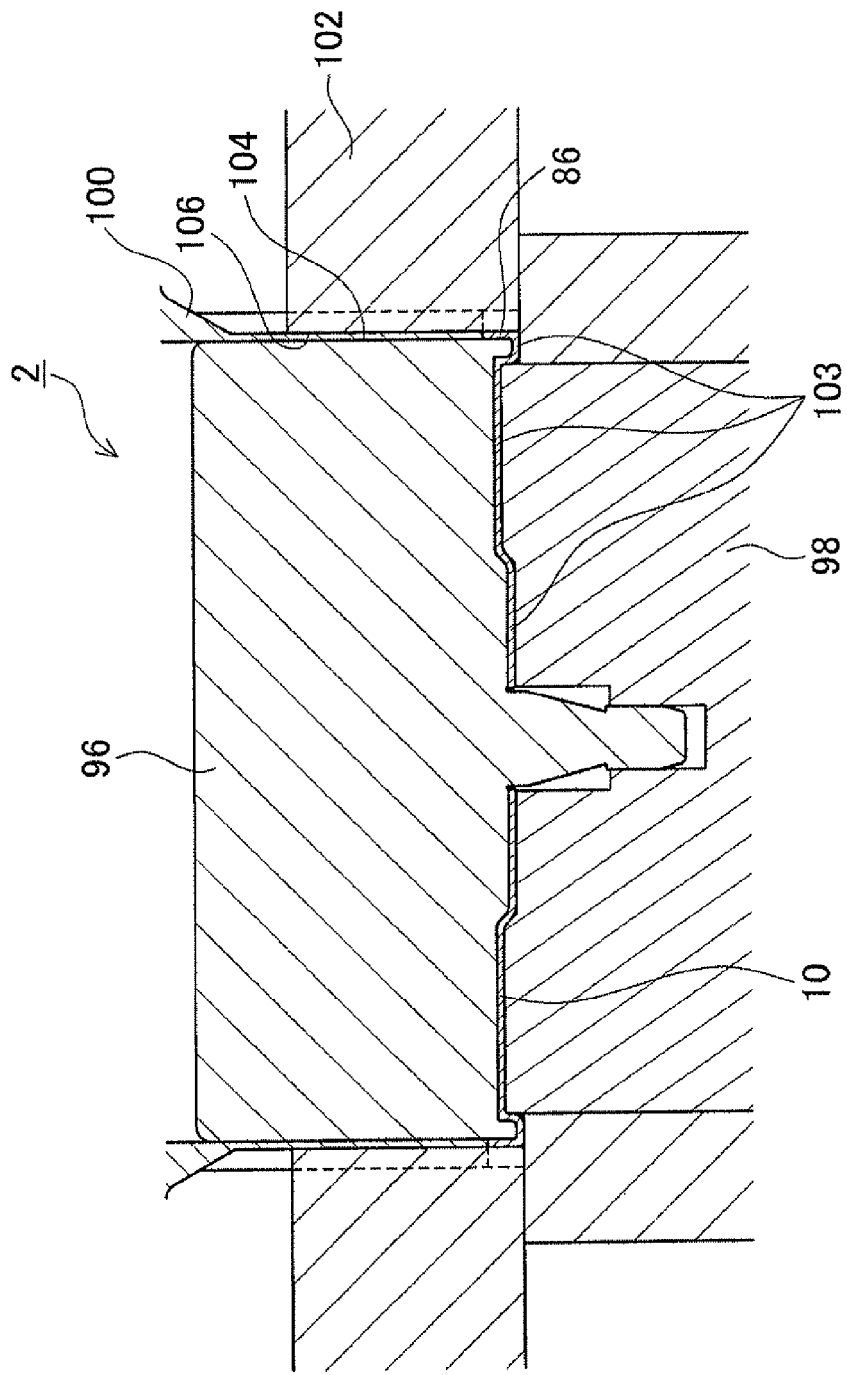
FIG. 26 shows the configuration of a main portion of a manufacturing device for a toothed member according to a second embodiment.

Next, a second embodiment will be described. In the following description, constituent elements that are equivalent to those according to the first embodiment are denoted by the same reference numerals so that the same description will not be repeated, and differences will be focused on. In the second embodiment, a manufacturing device 2 shown in FIG. 26 is used to perform a thickened tooth shaping process. More specifically, the workpiece placement process to the reduced-diameter tooth shaping process are performed on the workpiece 10, and the workpiece 10 after the reduced-diameter tooth shaping process is placed on the manufacturing device 2 to be subjected to the thickened tooth shaping process. As shown in FIG. 26, the manufacturing device 2 includes a restraint punch 96, a pressure receiving member 98, a compression punch 100, a die portion 102, and so forth. The restraint punch 96 includes a restraint surface 103 that restrains the bottom surface portion (the first portion 74, the second portion 76, and the outer bottom surface portion 80 of the third portion 78) of the workpiece 10, and an outer peripheral surface 104 provided to extend upright from an outer peripheral end portion of the restraint surface 103. Teeth are formed on the outer peripheral surface 104 of the restraint punch 96 and an inner peripheral surface 106 of the die portion 102.

In the thus structured manufacturing device 2, thickened tooth shaping is performed by the compression punch 100 compressing the reduced-diameter side wall portion 86 of the workpiece 10 with the workpiece 10 restrained by the restraint punch 96, the pressure receiving member 98, and the die portion 102.

In the embodiment, in the manufacturing device 2, as in the first embodiment, the compression punch 100 is driven by a first slide shaft (not shown), and the restraint punch 96 is driven by a second slide shaft (not shown). Then, as in the first embodiment, the workpiece 10 is restrained between the restraint punch 96 and the pressure receiving member 98 while the second slide shaft is applying to the restraint punch 96 such a load that allows maintaining a state in which the bottom surface portion (the first portion 74, the second portion 76, and the outer bottom surface portion 80 of the third portion 78) of the workpiece 10 is restrained in the thickened tooth shaping.

Consequently, it is possible to allow the restraint punch 96 to keep restraining the bottom surface portion of the workpiece 10 when the reduced-diameter side wall portion 86 is compressed by the compression punch 100 in the axial direction of the workpiece 10 (from the upper side of FIG. 26), which does not raise the restraint punch 96 from the bottom surface portion of the workpiece 10. Therefore, the material of the reduced-diameter side wall portion 86 is prevented from flowing into the space between a surface of the restraint punch 96 on the side of the workpiece 10 and the outer bottom surface portion 80 of the workpiece 10. This prevents trapping of the material, and allows manufacture of the toothed member 12 with improved durability.

At the start of the thickened tooth shaping process, as in the first embodiment, the reduced-diameter side wall portion 86 is not in contact with the small-diameter portion of the toothed portion of the restraint punch 96. Consequently, a space that allows the reduced-diameter side wall portion 86 to be expanded when the reduced-diameter side wall portion 86 is compressed by the compression punch 100 in the axial direction of the workpiece 10 is provided on the side of the small-diameter portion of the toothed portion of the restraint punch 96. Therefore, the material of the reduced-diameter side wall portion 86 is reliably prevented from flowing into the space between the surface of the restraint punch 96 on the side of the workpiece 10 and the outer bottom surface portion 80 of the workpiece 10. This reliably prevents trapping of the material, and allows manufacture of the toothed member 12 with improved durability.

The restraint punch 96 and the compression punch 100 are driven by separate slide shafts, and thus a sufficient load can be applied to the restraint punch 96 rather than a weak load applied by a spring or the like as in the related art. Therefore, the material of the reduced-diameter side wall portion 86 is more reliably prevented from flowing into the space between the surface of the restraint punch 96 on the side of the workpiece 10 and the outer bottom surface portion 80 of the workpiece 10 in the thickened tooth shaping process. This more reliably prevents trapping of the material, and allows manufacture of the toothed member 12 with improved durability.

The reduced-diameter side wall portion 86 in which teeth have been formed in advance is processed in the thickened tooth shaping process, and thus the load for compressing the reduced-diameter side wall portion 86 can be reduced. This reduces a force for raising the restraint punch 96 from the bottom surface portion of the workpiece 10 when the reduced-diameter side wall portion 86 is compressed. Thus, the material of the reduced-diameter side wall portion 86 is more reliably prevented from flowing into the space between the surface of the restraint punch 96 on the side of the workpiece 10 and the outer bottom surface portion 80 of the workpiece 10. This more reliably prevents trapping of the material, and allows manufacture of the toothed member 12 with improved durability. In addition, the side wall portion 88 with a thickened toothed shape can be formed easily by compressing the reduced-diameter side wall portion 86.

The second embodiment may be modified as described below. In this modification, a round punch is used as the restraint punch 96 in place of the punch with the outer peripheral surface 104 formed in a toothed shape as described above. Here, the round punch is a punch in which the outer peripheral surface 104 is smooth and has generally the same diameter over the entire periphery, that is, a punch in a circular column shape in which a toothed portion is formed in no part of the entire outer peripheral surface 104. In addition, a punch in which the inner peripheral surface 108 is smooth and has generally the same diameter over the entire periphery, that is, a punch in which a toothed portion is formed in no part of the entire inner peripheral surface 108, is used as the compression punch 100.

Figure 27:
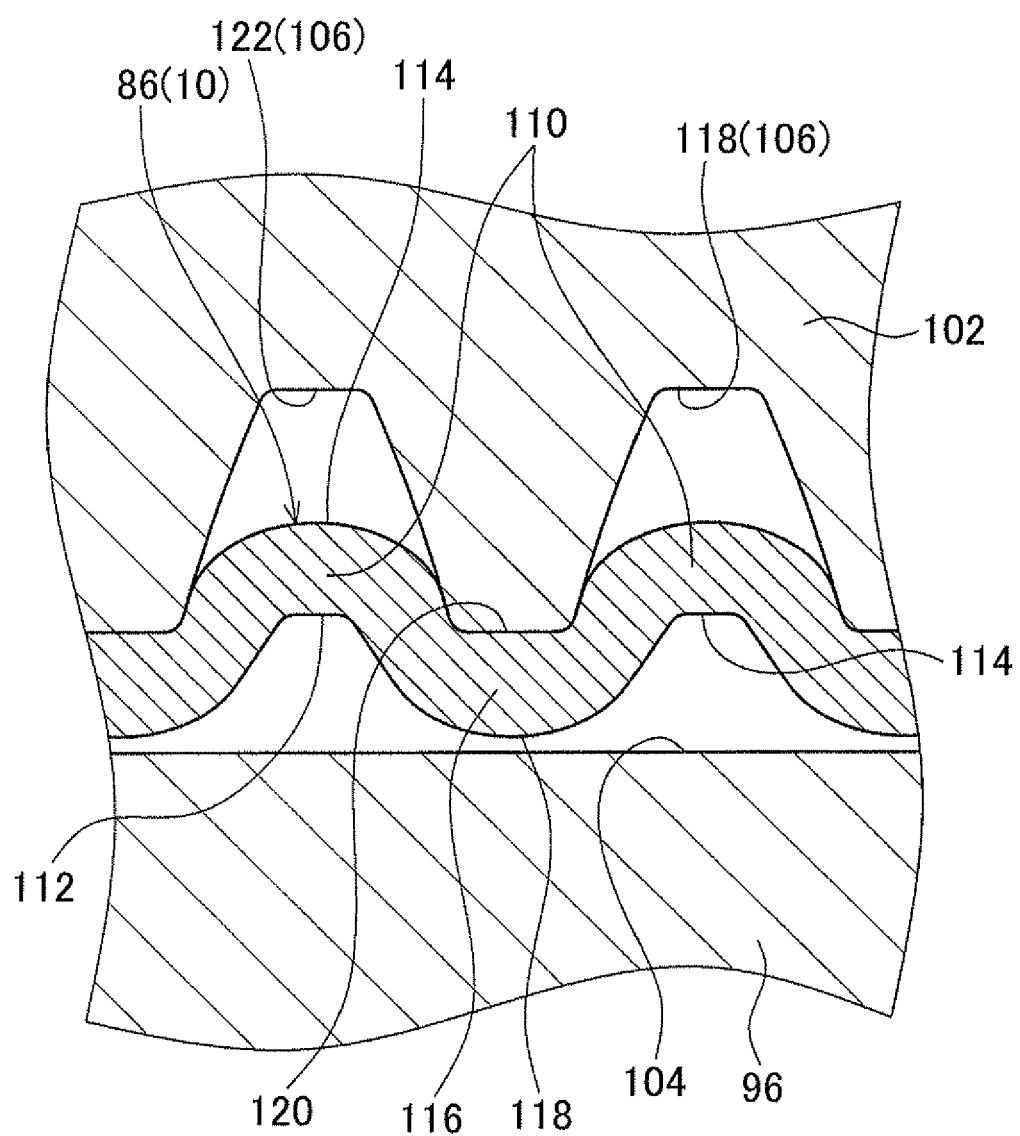
FIG. 27 is a cross-sectional view showing a main portion of a restraint punch, a workpiece, and a die portion at the start of a thickened tooth shaping process according to a modification of the second embodiment.

If the round punch is used as the restraint punch 96 in this way, thickened tooth shaping is performed in the thickened tooth shaping process as follows. First, at the start of the thickened tooth shaping process, as shown in FIG. 27, the reduced-diameter side wall portion 86 of the workpiece 10 has been formed with a toothed shape in advance so as to include a small-diameter portion 116 formed on the inner side in the radial direction and a large-diameter portion 110 formed on the outer side in the radial direction with respect to the small-diameter portion 116. Then, at this time, as shown in FIG. 27, none of a radially inner portion 112 and a radially outer portion 114 of the large-diameter portion 110 of the reduced-diameter side wall portion 86 of the workpiece 10 are restrained. That is, the large-diameter portion 110 of the reduced-diameter side wall portion 86 of the workpiece 10 is spaced (released) from a tooth root portion 122 of the inner peripheral surface 106 of the die portion 102 and the outer peripheral surface 104 of the restraint punch 96.

Then, as shown in FIG. 26, the compression punch 100 is relatively advanced with respect to the die portion 102 (moved in the lower direction of FIG. 26) with the cup-shaped workpiece 10 restrained by the restraint punch 96, the pressure receiving member 98, and the die portion 102. Then, with the workpiece 10 restrained in this way, the compression punch 100 compresses the reduced-diameter side wall portion 86 of the workpiece 10 in the axial direction of the workpiece 10 (in the lower direction of FIG. 26).

Figure 28:
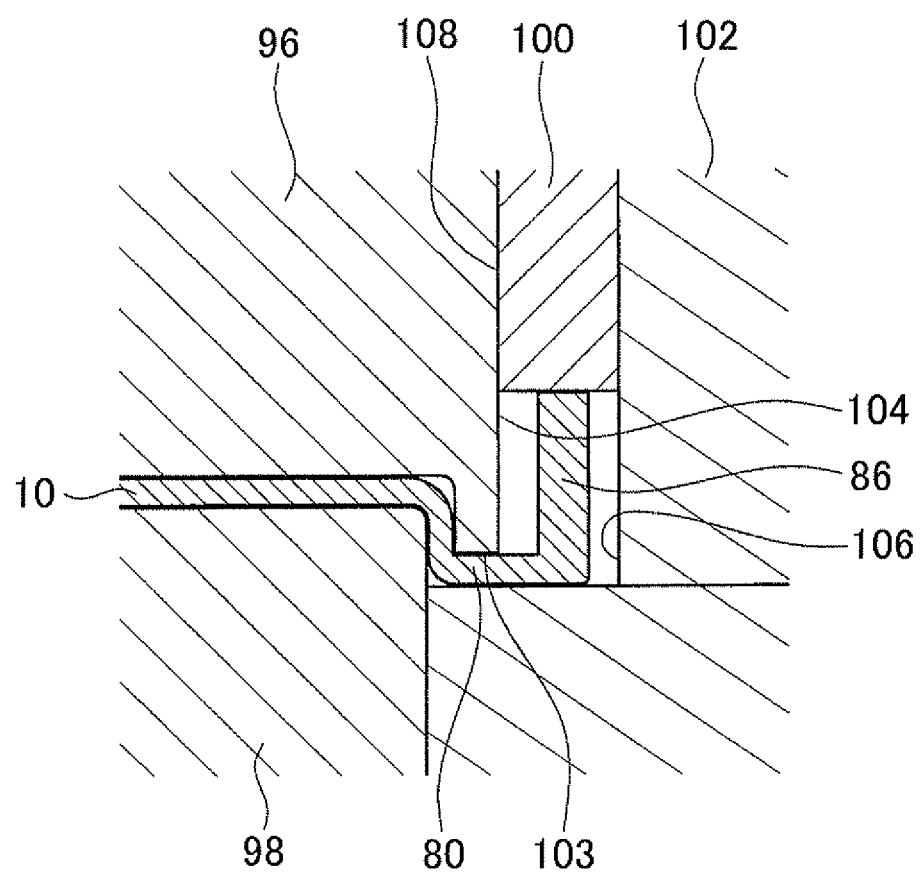
FIG. 28 is an enlarged sectional view showing the vicinity of the outer circumferential portion of the workpiece in the initial stage of the thickened tooth shaping process according to the modification of the second embodiment.
Figure 29:
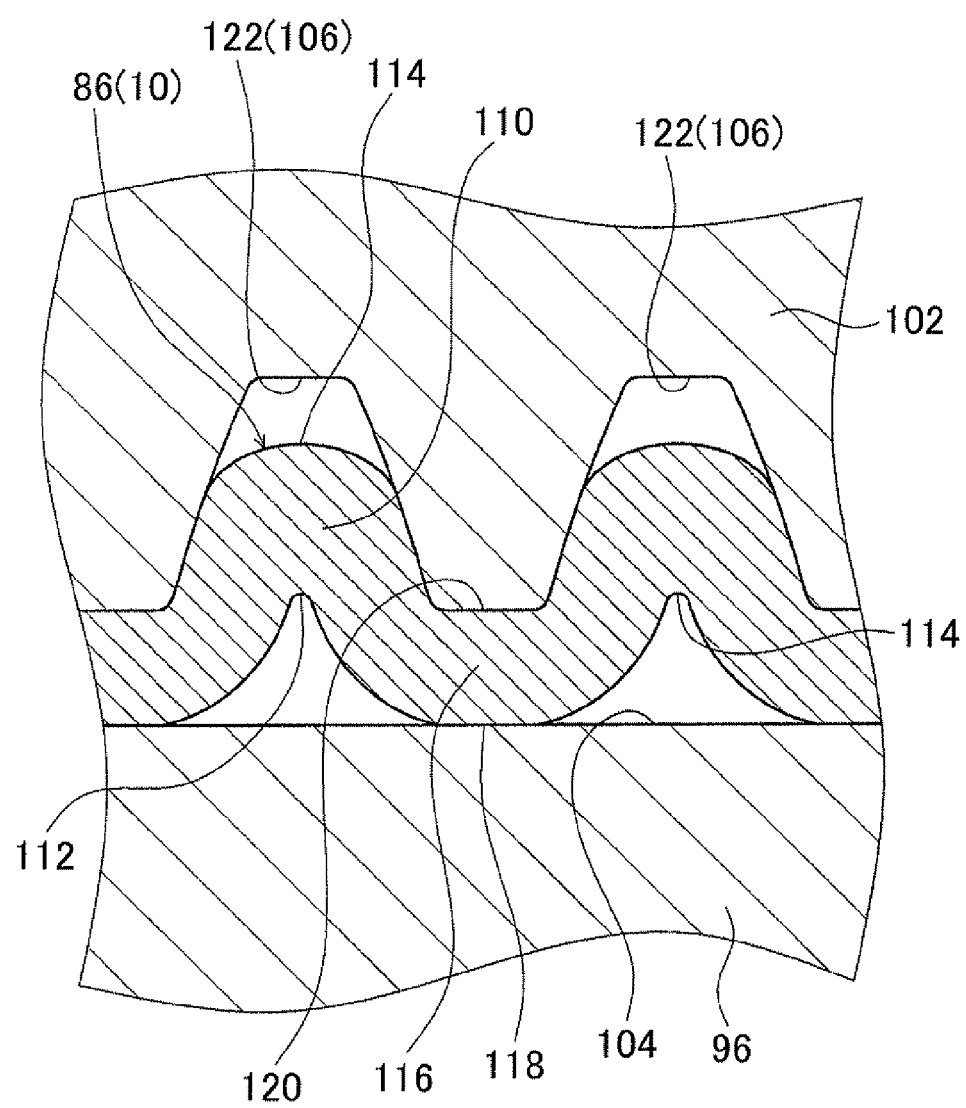
FIG. 29 is a cross-sectional view showing a main portion of the restraint punch, the workpiece, and the die portion in the initial stage of the thickened tooth shaping process according to the modification of the second embodiment.

Consequently, thickened tooth shaping is performed with the compression punch 100 compressing the reduced-diameter side wall portion 86 (see FIGS. 12 and 13) of the workpiece 10, which is disposed between the restraint punch 96 and the die portion 102, in the axial direction of the workpiece 10 (in the lower direction of FIG. 26). In more detail, in the initial stage of the thickened tooth shaping process, the height of the reduced-diameter side wall portion 86 starts reducing as shown in FIG. 28. Then, at the same time, the reduced-diameter side wall portion 86 starts expanding toward the outer peripheral surface 104 of the restraint punch 96 and the tooth root portion 122 on the inner peripheral surface 106 of the die portion 102 as shown in FIG. 29, which causes the thickness of the reduced-diameter side wall portion 86 to start increasing. At this time, as described above, none of the radially inner portion 112 and the radially outer portion 114 of the large-diameter portion 110 of the reduced-diameter side wall portion 86 are restrained. That is, the large-diameter portion 110 is spaced from the tooth root portion 122 of the die portion 102 and the outer peripheral surface 104 of the restraint punch 96. Both of a radially inner portion 118 and a radially outer portion 120 of the small-diameter portion 116 of the reduced-diameter side wall portion 86 of the workpiece 10 are restrained.

Figure 30:
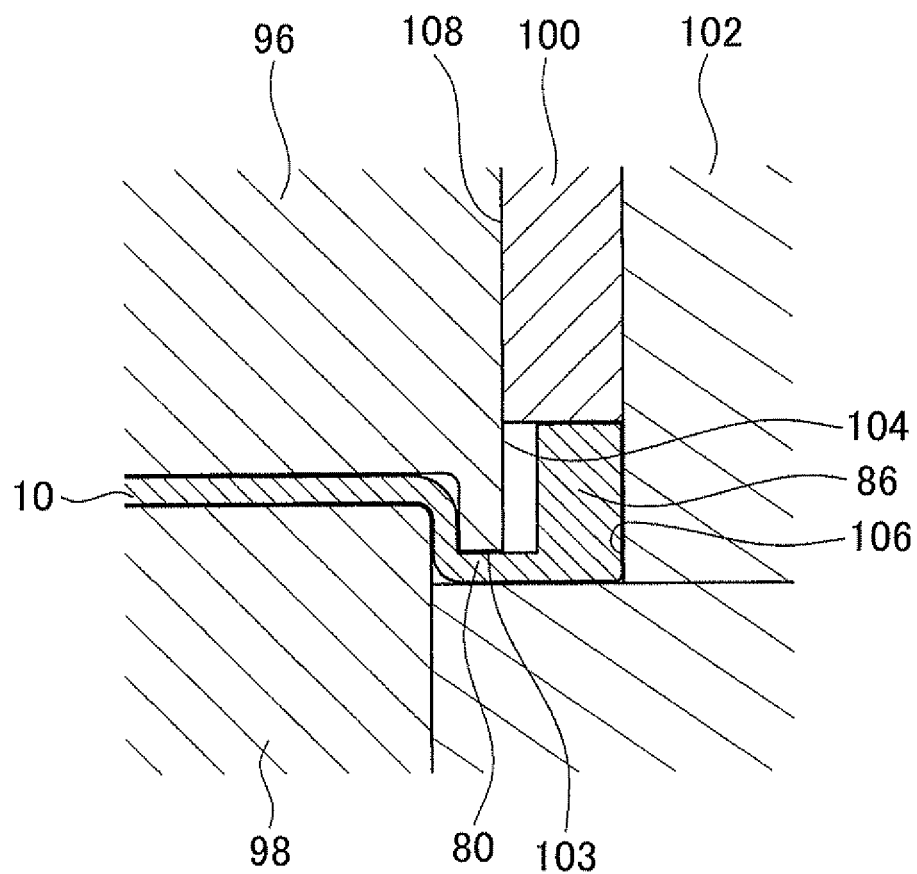
FIG. 30 is an enlarged sectional view showing the vicinity of the outer circumferential portion of the workpiece in the intermediate stage of the thickened tooth shaping process according to the modification of the second embodiment.
Figure 31:
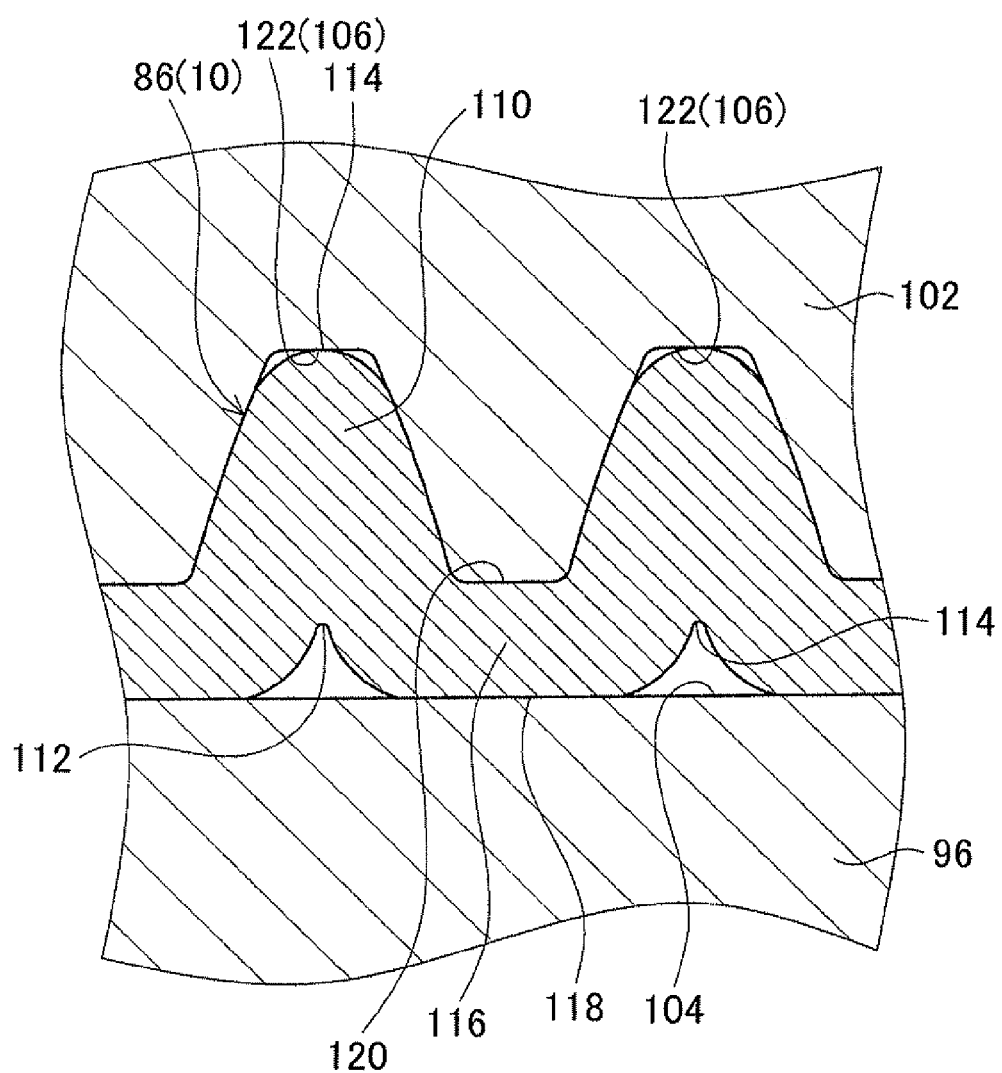
FIG. 31 is a cross-sectional view showing a main portion of the restraint punch, the workpiece, and the die portion in the intermediate stage of the thickened tooth shaping process according to the modification of the second embodiment.

After that, as the thickened tooth shaping process progresses, the height of the reduced-diameter side wall portion 86 further reduces as shown in FIG. 30. Then, at the same time, the reduced-diameter side wall portion 86 expands toward the outer peripheral surface 104 of the restraint punch 96 and the tooth root portion 122 of the die portion 102 as shown in FIG. 31, which further increases the thickness of the reduced-diameter side wall portion 86.

Figure 33:
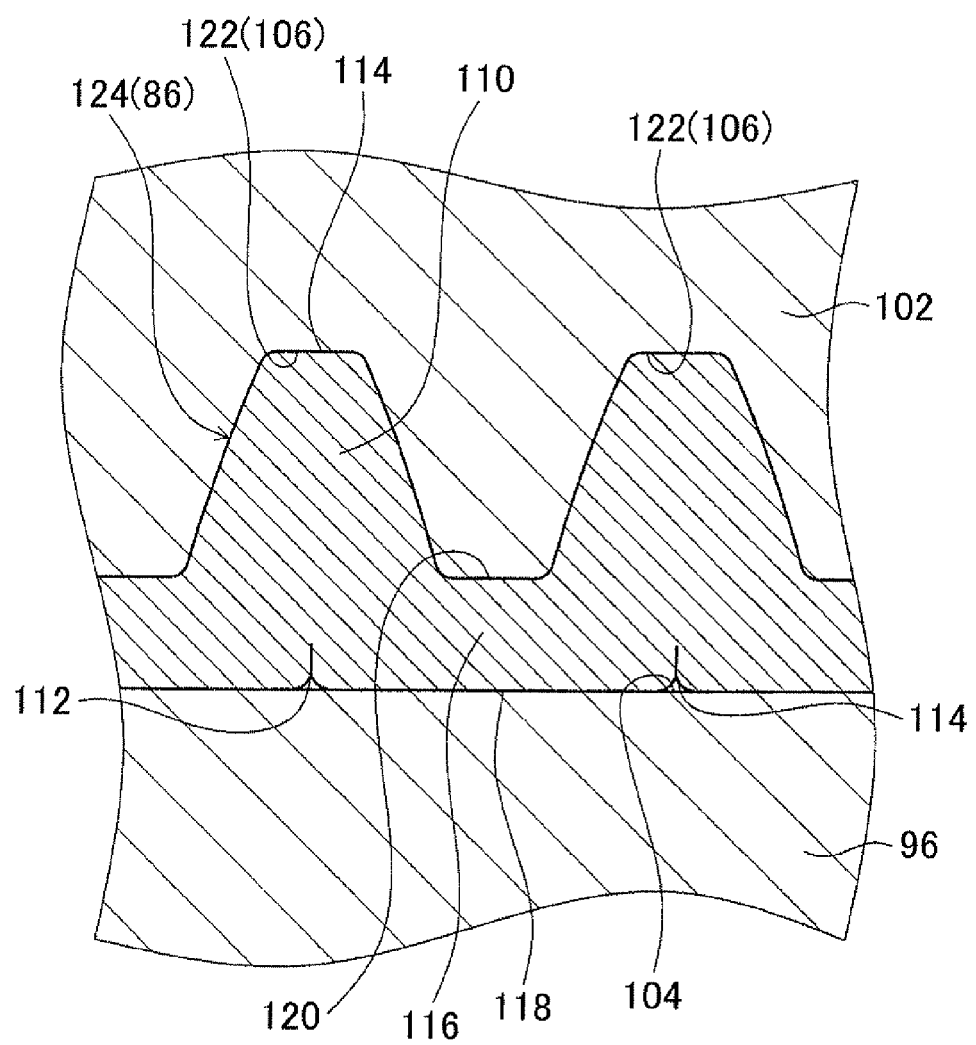
FIG. 33 is a cross-sectional view showing a main portion of the restraint punch, the workpiece, and the die portion at the time when the thickened tooth shaping process is finished according to the modification of the second embodiment.

Then, when the thickened tooth shaping process is finished, the height of the reduced-diameter side wall portion 86 is further reduced to form a side wall portion 124 as shown in FIG. 32. At this time, the material of the reduced-diameter side wall portion 86 fills the space between the outer peripheral surface 104 of the restraint punch 96 and the tooth root portion 122 of the die portion 102 as shown in FIG. 33, thereby forming the side wall portion 124 in a thickened toothed shape.

Figure 34:
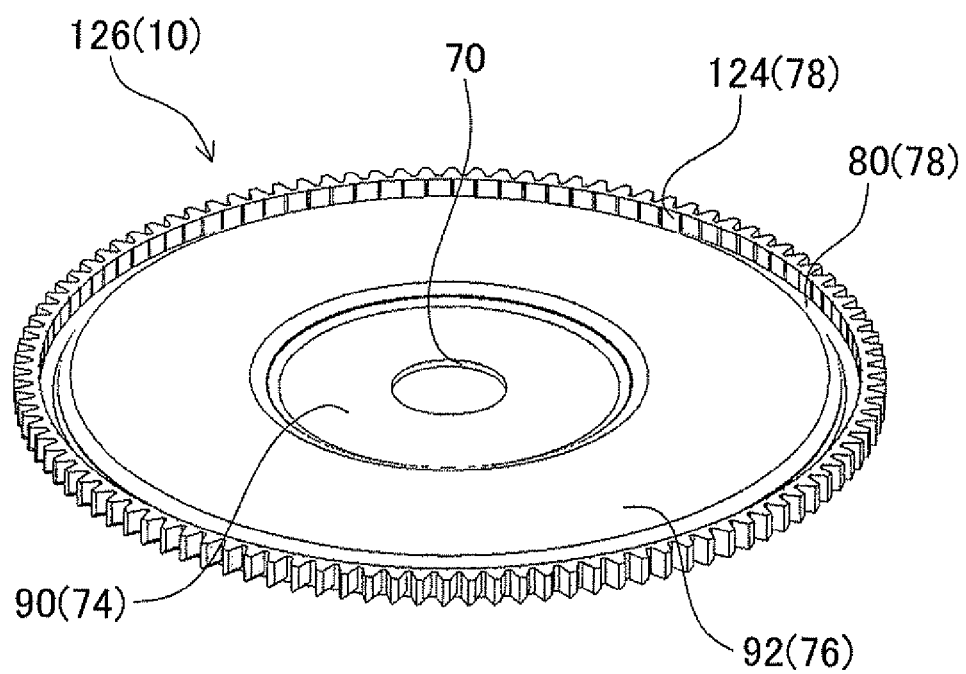
FIG. 34 is a perspective view showing the appearance of the workpiece after the thickened tooth shaping process is performed according to the modification of the second embodiment.

By performing the thickened tooth shaping process as described above, a toothed member 126 having the side wall portion 124 formed with a toothed shape thickened compared to the inner bottom surface portion 90, the intermediate bottom surface portion 92, and the outer bottom surface portion 80 as shown in FIG. 34 is formed. In particular, the thus formed side wall portion 124 has a thickness larger than that of the side wall portion 88 (see FIG. 22) according to the first embodiment. Therefore, the toothed member 126 has improved strength compared to the toothed member 12 (see FIG. 22) according to the first embodiment.

Figure 35:
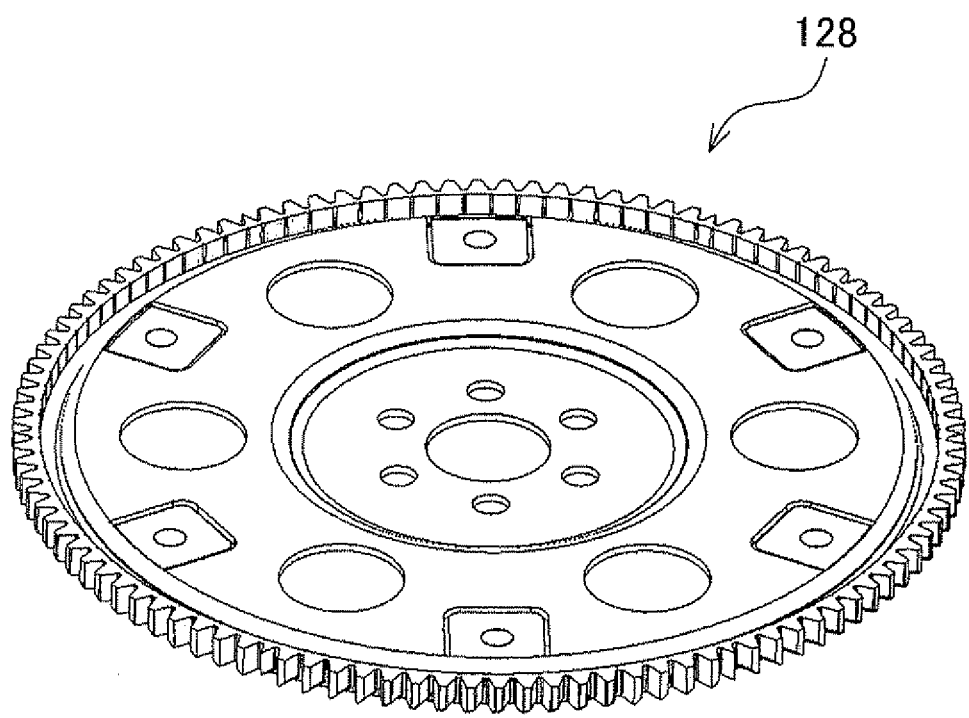
FIG. 35 is a perspective view showing the appearance of a drive plate formed integrally with a ring gear according to the modification of the second embodiment.
Figure 36:
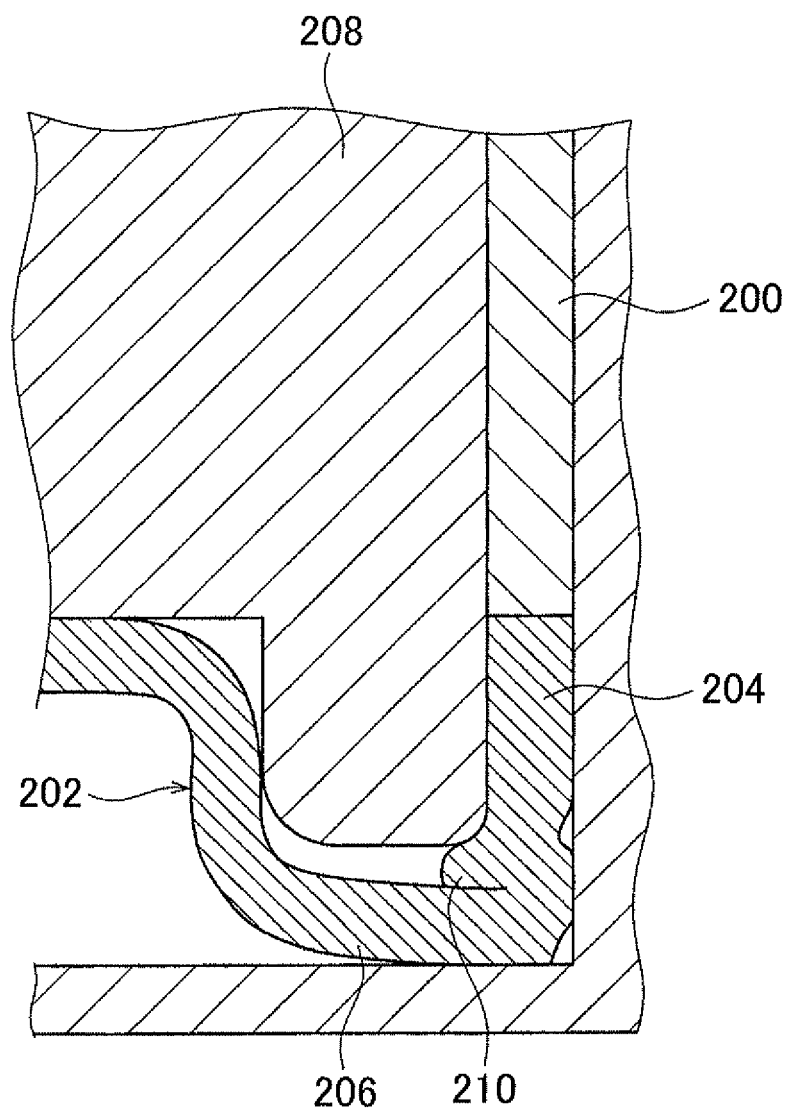
FIG. 36 illustrates trapping of the material in a manufacturing method according to Japanese Patent No. 2885266.

The toothed member 126 formed as described above may thereafter be further subjected to additional processes such as a heat treatment and a hole forming process to form a drive plate 128 shaped as shown in FIG. 35, for example.

According to the modification of the second embodiment described above, the following effects can be further obtained in addition to the effects of the second embodiment described above. In the modification of the second embodiment, the restraint punch 96 includes the restraint surface that restrains the bottom surface portion of the cup-shaped workpiece 10, and the outer peripheral surface 104 provided to extend upright from an outer peripheral end portion of the restraint surface. The reduced-diameter side wall portion 86 of the workpiece 10 has been formed with a toothed shape in advance so as to include the small-diameter portion 116 formed on the inner side in the radial direction and the large-diameter portion 110 formed on the outer side in the radial direction with respect to the small-diameter portion 116, and the large-diameter portion 110 of the reduced-diameter side wall portion 86 of the workpiece 10 is spaced from the outer peripheral surface 104 of the restraint punch 96 at the start of the thickened tooth shaping process. In this way, at the start of the thickened tooth shaping process, none of the radially inner portion 112 and the radially outer portion 114 of the large-diameter portion 110 of the reduced-diameter side wall portion 86 of the workpiece 10 are restrained. Consequently, as the reduced-diameter side wall portion 86 of the workpiece 10 is compressed, the material of the reduced-diameter side wall portion 86 of the workpiece 10 flows radially inward and radially outward. Therefore, the thickness of the side wall portion 124 of the toothed member 126 (a ring gear portion of the drive plate 128) can be increased. This improves the strength of the toothed member 126 (drive plate 128).

The outer peripheral surface 104 of the restraint punch 96 is a smooth surface having generally the same diameter over the entire periphery. Therefore, the strength of the restraint punch 96 is improved compared to a case where the restraint punch 96 is a punch in which a toothed shape is formed on the outer peripheral surface 104. This extends the life of the compression punch 96. This also allows manufacture of the toothed member 126 (drive plate 128) with a large tooth depth. In addition, the round punch can be manufactured inexpensively, thereby reducing the cost of the restraint punch 96.

Further, the large-diameter portion 110 of the reduced-diameter side wall portion 86 of the workpiece 10 is spaced from the outer peripheral surface 104 of the restraint punch 96 at the start of the thickened tooth shaping process. Thus, a space that allows the reduced-diameter side wall portion 86 to be expanded when the reduced-diameter side wall portion 86 is compressed by the compression punch 100 is provided on the side of the outer peripheral surface 104 of the restraint punch 96. Therefore, the material of the reduced-diameter side wall portion 86 is prevented from flowing into the space between the restraint surface 103 of the restraint punch 96 and the outer bottom surface portion 80 of the workpiece 10 on the outer peripheral surface 104 of the restraint punch 96, thereby preventing trapping of the material more reliably.

The embodiments described above are merely illustrative, and do not limit the present invention in any way. It is a matter of course that various improvements and modifications may be made without departing from the scope and spirit of the present invention.

The invention claimed is:

1. A manufacturing method for a toothed member, the method comprising:
    providing a cup-shaped raw material, the cup-shaped raw material comprising a bottom surface portion and a cylindrical side wall portion that extends upright from an outer peripheral end portion of the bottom surface;
    providing a manufacturing device comprising a compression die, a restraint die and a pressure receiving member;
    compressing the side wall portion in an axial direction of the cup-shaped raw material using the compression die;
    restraining a first surface of the bottom surface portion located on a side of an opening end of the cup-shaped raw material using the restraint die;
    restraining a second surface of the bottom surface portion located on the opposite side of the bottom surface portion from the first surface portion using the pressure receiving member;
    a thickened tooth shaping process in which a toothed shape is formed on the side wall portion while making a thickness of the side wall portion larger than a thickness of the bottom surface portion by relatively moving the compression die with respect to the restraint die and the pressure receiving member in the axial direction from the side of the opening of the cup-shaped raw material toward the bottom side portion;
    wherein the thickened tooth shaping process further comprises applying a load to the restraint die to keep restraining the first surface and the second surface.

2. The manufacturing method for a toothed member according to claim 1, wherein:
    the restraint die includes a restraint surface that restrains the first surface and an outer peripheral surface provided to extend upright from an outer peripheral end portion of the restraint surface and having a toothed portion formed on the outer peripheral surface; and the side wall portion is in contact with a tooth tip portion of the toothed portion but not in contact with a tooth root portion of the toothed portion at start of the thickened tooth shaping process.

3. The manufacturing method for a toothed member according to claim 1, wherein:
the restraint die includes a restraint surface that restrains the first surface and an outer peripheral surface provided to extend upright from an outer peripheral end portion of the restraint surface; and
the side wall portion has been formed with a toothed shape in advance so as to include a small-diameter portion formed on an inner side in a radial direction and a large-diameter portion formed on an outer side in the radial direction with respect to the small-diameter portion, and the large-diameter portion of the side wall portion is spaced from the outer peripheral surface of the restraint die at start of the thickened tooth shaping process.

4. The manufacturing method for a toothed member according to claim 3, wherein
the outer peripheral surface of the restraint die is a smooth surface having generally the same diameter over the entire periphery.

5. The manufacturing method for a toothed member according to claim 1, wherein
the compression die is driven by a first slide shaft, and the restraint die is driven by a second slide shaft.

6. The manufacturing method for a toothed member according to claim 2, wherein
the compression die is driven by a first slide shaft, and the restraint die is driven by a second slide shaft.

7. The manufacturing method for a toothed member according to claim 3, wherein
the compression die is driven by a first slide shaft, and the restraint die is driven by a second slide shaft.

8. The manufacturing method for a toothed member according to claim 4, wherein
the compression die is driven by a first slide shaft, and the restraint die is driven by a second slide shaft.

9. The manufacturing method for a toothed member according to claim 1, wherein
the thickened tooth shaping process includes compressing the side wall portion which has been formed with a toothed shape in advance.

10. The manufacturing method for a toothed member according to claim 2, wherein
the thickened tooth shaping process includes compressing the side wall portion which has been formed with a toothed shape in advance.

11. The manufacturing method for a toothed member according to claim 5, wherein
the thickened tooth shaping process includes compressing the side wall portion which has been formed with a toothed shape in advance.

12. The manufacturing method for a toothed member according to claim 6, wherein
the thickened tooth shaping process includes compressing the side wall portion which has been formed with a toothed shape in advance.

13. The manufacturing method for a toothed member according to claim 7, wherein
the thickened tooth shaping process includes compressing the side wall portion which has been formed with a toothed shape in advance.

14. The manufacturing method for a toothed member according to claim 8, wherein
the thickened tooth shaping process includes compressing the side wall portion which has been formed with a toothed shape in advance.

15. The manufacturing method for a toothed member according to claim 1, further comprising:
a cup-shaped raw material shaping process in which a disk-shaped raw material is processed while the first surface and the second surface are restrained by the restraint die to form the cup-shaped raw material, wherein
the cup-shaped raw material shaping process and the thickened tooth shaping process are performed in a single-stroke operation in which the restraint die and the pressure receiving member are driven in one direction.

16. The manufacturing method for a toothed member according to claim 2, further comprising:
a cup-shaped raw material shaping process in which a disk-shaped raw material is processed while the first surface and the second surface are restrained by the restraint die to form the cup-shaped raw material, wherein
the cup-shaped raw material shaping process and the thickened tooth shaping process are performed in a single-stroke operation in which the restraint die and the pressure receiving member are driven in one direction.

17. The manufacturing method for a toothed member according to claim 3, further comprising:
a cup-shaped raw material shaping process in which a disk-shaped raw material is processed while the first surface and the second surface are restrained by the restraint die to form the cup-shaped raw material, wherein
the cup-shaped raw material shaping process and the thickened tooth shaping process are performed in a single-stroke operation in which the restraint die and the pressure receiving member are driven in one direction.

18. The manufacturing method for a toothed member according to claim 4, further comprising:
a cup-shaped raw material shaping process in which a disk-shaped raw material is processed while the first surface and the second surface are restrained by the restraint die to form the cup-shaped raw material, wherein
the cup-shaped raw material shaping process and the thickened tooth shaping process are performed in a single-stroke operation in which the restraint die and the pressure receiving member are driven in one direction.

* * * * *